United States Patent
Lee et al.

(10) Patent No.: US 10,782,765 B2
(45) Date of Patent: Sep. 22, 2020

(54) METHOD AND ELECTRONIC DEVICE FOR OUTPUTTING IMAGE

(71) Applicant: Samsung Electronics Co., Ltd., Gyeonggi-do (KR)

(72) Inventors: Jong Won Lee, Seoul (KR); Sung Jae Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 19 days.

(21) Appl. No.: 15/406,098

(22) Filed: Jan. 13, 2017

(65) Prior Publication Data
US 2017/0199622 A1   Jul. 13, 2017

(30) Foreign Application Priority Data

Jan. 13, 2016 (KR) ............... 10-2016-0004166
Aug. 30, 2016 (KR) ............... 10-2016-0111127

(51) Int. Cl.
| | |
|---|---|
| *G06F 1/3231* | (2019.01) |
| *G06F 1/3234* | (2019.01) |
| *G06F 3/0488* | (2013.01) |
| *G06F 3/0481* | (2013.01) |
| *G06F 3/0482* | (2013.01) |
| *G06F 3/0483* | (2013.01) |

(Continued)

(52) U.S. Cl.
CPC .......... *G06F 1/3231* (2013.01); *G04G 21/00* (2013.01); *G06F 1/163* (2013.01); *G06F 1/3265* (2013.01); *G06F 3/0481* (2013.01); *G06F 3/0482* (2013.01); *G06F 3/0483* (2013.01); *G06F 3/0488* (2013.01)

(58) Field of Classification Search
CPC ........ G06F 3/14; G06F 3/0412; G06F 3/0416; G06F 3/048; G06F 3/0487; G06F 3/0488; G06F 1/163; G06F 1/3265; G06F 1/3231; G04G 9/0064
See application file for complete search history.

(56) References Cited

U.S. PATENT DOCUMENTS 6,128,012 A * 10/2000 Seidensticker, Jr. ........................
   G06F 3/0482
   345/685
2003/0174138 A1* 9/2003 Shibayama ............. G09G 5/397
   345/545

(Continued)

FOREIGN PATENT DOCUMENTS

| KR | 1020150084739 | 7/2015 | |
|---|---|---|---|
| WO | WO 2016/153104 A1 * | 9/2016 | ........... G06F 3/0488 |

OTHER PUBLICATIONS

English Translation for WO 2016/153104 A1, Apr. 25, 2018. pp. 1-19.*

*Primary Examiner* — Jimmy H Nguyen
(74) *Attorney, Agent, or Firm* — The Farrell Law Firm, P.C.

(57) ABSTRACT

Disclosed is an electronic device including a display, a memory, an input device configured to receive a user input, and a processor which stores a first image that is produced by a first application, in the memory, outputs the first image stored in the memory on the display by activation of the first application, if a second application is activated in response to the user input, provides the first image in a second image that is provided by the second application and stores the second image including the first image in the memory, and outputs the second image stored in the memory on the display.

9 Claims, 14 Drawing Sheets

(51) Int. Cl.
*G06F 1/16* (2006.01)
*G04G 21/00* (2010.01)

(56) References Cited

U.S. PATENT DOCUMENTS

| | | | |
|---|---|---|---|
| 2009/0320305 A1* | 12/2009 | Ito | B82Y 25/00 33/356 |
| 2010/0082414 A1* | 4/2010 | Shimaya | G06F 1/3218 705/14.4 |
| 2010/0299597 A1* | 11/2010 | Shin | G06F 3/0482 715/702 |
| 2016/0034133 A1* | 2/2016 | Wilson | G06F 3/0488 715/772 |

* cited by examiner

METHOD AND ELECTRONIC DEVICE FOR OUTPUTTING IMAGE

PRIORITY

This application claims priority under 35 U.S.C. § 119(a) to Korean Patent Applications filed in the Korean Intellectual Property Office on Jan. 13, 2016 and assigned Serial Number 10-2016-0004166, and on Aug. 30, 2016 and assigned Serial number 10-2016-0111127, the contents of each of which are incorporated herein by reference.

BACKGROUND

1. Field of the Disclosure

The present disclosure relates generally to an electronic device, and more particularly, to a method of outputting an image in the electronic device.

2. Description of the Related Art

In recent years, electronic devices have been implemented in the forms of a transportable smartphone and wearable devices. A smartwatch is a type of wearable device, and may be mounted on a wrist of the user to function as a traditional watch and to implement various additional functions, such as detection of a biometric signal, measurement of performed exercises, and connection to a network.

The wearable device is attached to a portion of the body of the user, and thus, needs to be light-weight and minimal in size. Accordingly, the capacity of the battery mounted on the wearable device tends to be limited, and in turn, reduction of power consumption is one of the most important issues in designing the wearable device.

The smartwatch includes a display of about 1 to 2 inches, which may output an image of a watch to implement a watch function. In the process, however, a substantial amount of power is consumed, which inconveniently decreases an in-use time of the smartwatch.

As such, there is a need in the art for a method and apparatus that reduce power consumption and increase in-use time of such electronic devices.

SUMMARY

Aspects of the present disclosure are to address at least the above-mentioned problems and/or disadvantages and to provide at least the advantages described below. Accordingly, an aspect of the present disclosure is to provide an electronic device that may reduce power consumption of a battery due to output of an image without hampering the user interface/user experience (UI/UX), and a method of outputting an image.

In accordance with an aspect of the present disclosure, there is provided an electronic device including a display, a memory, an input device configured to receive a user input, and a processor electrically connected to the display, the memory, and the input device, wherein the memory stores instructions which, when executed, cause the processor to store, in the memory, a first image that is produced by a first application, output the first image stored in the memory on the display by activation of the first application, include, if a second application is activated in response to the user input, the first image in a second image that is provided by the second application and store the second image in the memory, and output the second image stored in the memory on the display.

In accordance with another aspect of the present disclosure, there is provided an electronic device including a display, a memory configured to store a first application and a second application, and a processor electrically connected to the memory and the display, wherein the processor is configured to produce a first image by the first application, produce a second image by the second application, and provide the first image and the second image to the display, which composes the first image and the second image, and outputs a composite image of the first image and the second image.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF EMBODIMENTS OF THE DISCLOSURE

Figure 1A:
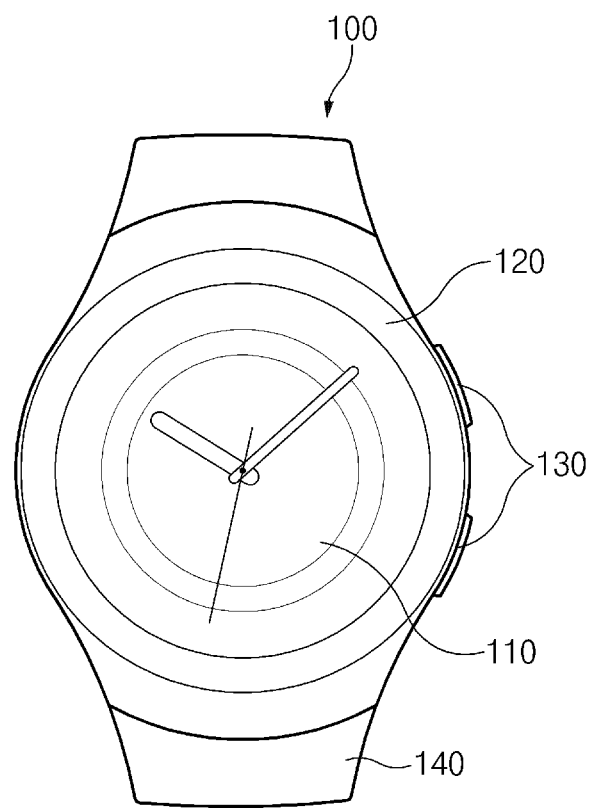
FIG. 1A illustrates an electronic device according to embodiments of the present disclosure.

Hereinafter, embodiments of the present disclosure will be described with reference to the accompanying drawings. Accordingly, those of ordinary skill in the art will recognize that modifications, equivalents, and/or alternatives to the embodiments described herein can be variously made without departing from the scope and spirit of the present disclosure. In the description of drawings, similar components may be marked by similar reference numerals.

In the disclosure disclosed herein, the expressions "have", "may have", "include" and "comprise", or "may include" and "may comprise" used herein indicate the existence of corresponding features and elements such as numeric values, functions, operations, or components, but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element, such as a first element, is referred to as being "(operatively or communicatively) coupled with/to" or "connected to" another element, such as a second element, the first element can be directly coupled with/to or connected to the second element or an intervening element, such as a third element, may be present. In contrast, when the first element is referred to as being "directly coupled with/to" or "directly connected to" the second element, it should be understood that there is no intervening third element present.

According to the situation, the expression "configured to" used herein may be interchangeably used with the expression "suitable for", "having the capacity to", "designed to", "adapted to", "made to", or "capable of". The term "configured to" must not indicate only "specifically designed to" in hardware. Instead, the expression "a device configured to" may indicate that the device is "capable of" operating together with another device or other components. A "processor configured to perform A, B, and C" may indicate a dedicated or embedded processor for performing a corresponding operation or a generic-purpose processor, such as a central processing unit (CPU) or an application processor, which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in embodiments of the present disclosure. In some cases, even if terms are defined in the specification, they may not be interpreted to exclude embodiments of the present disclosure.

An electronic device according to embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to embodiments of the present disclosure, the wearable devices may include accessories, such as watches, rings, bracelets, ankle bracelets, glasses, contact lenses, or head-mounted devices (HMDs), cloth-integrated types, such as electronic clothes, body-attached types, such as skin pads or tattoos, or implantable types, such as implantable circuits.

In some embodiments of the present disclosure, the electronic device may be one of home appliances. The home appliances may include at least one of a digital video disk (DVD) player, an audio, a refrigerator, an air conditioner, a cleaner, an oven, a microwave oven, a washing machine, an air cleaner, a set-top box, a home automation control panel, a security control panel, a TV box, such as Samsung HomeSync™, Apple TV™, or Google TV™, a game console, such as Xbox™ or PlayStation™, an electronic dictionary, an electronic key, a camcorder, or an electronic panel.

In another embodiment of the present disclosure, the electronic device may include at least one of various portable medical measurement devices including a blood glucose meter, a heart rate measuring device, a blood pressure measuring device, and a body temperature measuring device, magnetic resonance angiography (MRA), magnetic resonance imaging (MRI) device, computed tomography (CT) device, a photographing device, and an ultrasonic device, a navigation system, a global navigation satellite system (GNSS), an event data recorder (EDR), a flight data recorder (FDR), a vehicular infotainment device, electronic devices for vessels, such as a navigation device and a gyro compass, avionics, a security device, a vehicular head unit, an industrial or home robot, an automatic teller machine (ATM) of a financial company, a point of sales (POS) device, or an Internet of things device, such as a light bulb, various sensors, an electricity or gas meter, a spring cooler device, a fire alarm device, a thermostat, an electric pole, a toaster, a sporting apparatus, a hot water tank, a heater, and a boiler.

According to some embodiments of the present disclosure, the electronic device may include at least one of a furniture or a part of a building/structure, an electronic board, an electronic signature receiving device, a projector, or various measurement devices including a water service, electricity, gas, or electric wave measuring device. The electronic device may be one or a combination of the aforementioned devices and may be a flexible electronic device, but is not limited to the aforementioned devices and may include new electronic devices produced due to the development of new technologies.

Hereinafter, electronic devices according to an embodiment of the present disclosure will be described with reference to the accompanying drawings. Although a smartwatch will be described as the electronic device in the specification, it may be for convenience. The present disclosure does not exclude embodiments of the present disclosure which are applied to the above-described devices. The term "user" used herein may refer to a person who uses an electronic device or may refer to an artificial intelligence electronic device that uses an electronic device.

FIG. 1A illustrates an electronic device according to embodiments of the present disclosure.

Referring to FIG. 1A, the electronic device 100 may correspond to a smartwatch and may include a display 110, a rotary member 120, one or more physical buttons 130, and a band 140.

The display 110 may include a liquid crystal display (LCD), a light emitting diode (LED) display, an organic light emitting diode (OLED) display, a microelectromechanical system (MEMS) display, or an electronic paper display, and may display various contents to a user, such as an image including a watch object. The display 110 may have various shapes, such as a circular shape or a polygonal shape such as rectangular, and may include a touch screen that may receive a touch input from the user.

The rotary member 120 may correspond to a user interface through which the user and the electronic device 100 may interact. According to embodiments, the rotary member 120 may not be employed in the electronic device 100. The rotary member 120 may be referred to by various terms, such as a rotary wheel or a rotational bezel. The rotary member 120 may be a ring-shaped rotary member that surrounds a periphery of the display 110 and is rotatable on a surface center of the display 110. The rotary member 120 may be rotated in a first direction, such as clockwise (CW), or in a second direction, such as counterclockwise (CCW), on a surface center of the display 110.

According to an embodiment, the rotary member 120 may provide a discrete haptic reaction to the user for each specific rotational angle as the rotary member 120 is rotated. For example, the rotary member 120 may include a physical boss, such as a detent, for each specific angle on an interior (e.g., that is close to the display 110) of the rotary member to provide the haptic reaction to the user. The number of the bosses may be closely associated with the number of haptic reactions during a rotation input. The mechanical click feeling that is generated by the bosses may be provided to the user as a haptic reaction when the rotary member 120 is rotated. As another example, the rotary member 120 may include a haptic reaction support structure that is implemented magnetically instead of including a physical boss.

The one or more physical buttons 130 may correspond to a user interface through which the user and the electronic device 100 may interact. For example, the physical buttons 130 may include a home button for outputting a home screen and a back button for returning the screen to a previous screen.

The band 140 may correspond to a configuration for mounting the electronic device 100 on a part, such as a wrist, ankle, or neck of the body of the user. For example, the band 140 may be formed of a rubber, a synthetic rubber, a synthetic resin, such as an elastomer, leather of an animal, such as a cow or an alligator, metal, such as a stainless steel, gold, or platinum or fabric, such as nylon or kevlar.

Figure 1B:
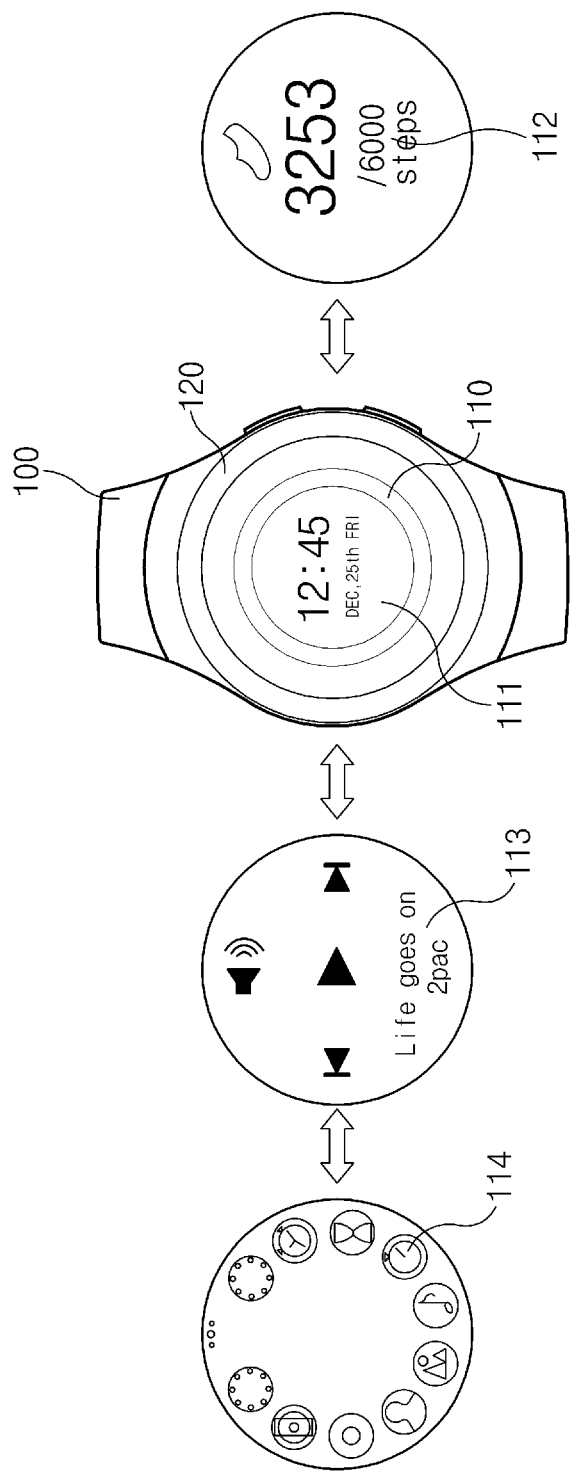
FIG. 1B illustrates a UI/UX of an electronic device according to embodiments of the present disclosure.

FIG. 1B illustrates UI/UX of an electronic device according to embodiments of the present disclosure.

Referring to FIG. 1B, the electronic device 100 according to embodiments of the present disclosure, various views 111, 112, 113, and 114 may be output on the display 110 based on a second application which will be described below. In the disclosure, the view may refer to a screen or graphic data of the screen that is output on the display 110. For example, the view may refer to a window and may include a text or an image that is produced by an application that is being executed, or a combination thereof. Accordingly, the expression that the view is output on the display 110 may indicate that the text, the image, or the combination thereof is output. According to an embodiment, the electronic device 100 may output various views 111, 112, 113, and 114 on the display 110 in response to a user input, such as a rotation of the rotary member 120. For example, if the user input is received by the rotary member 120 being rotated clockwise (CW) when the electronic device 100 outputs the view 111 including an image containing a watch object on the display 110, the view 112 including a text and an image that indicate the number of steps taken by the user may be output on the display 110. If another user input is received, such as the rotary member 120 being rotated counterclockwise (CCW), when the electronic device 100 outputs the view 111 including an image containing a watch object on the display 110, the view 113 including a symbol and a text based on a music play application and the view 114 including icons of applications installed in the electronic device 100 may be sequentially output on the display 110.

According to another embodiment, the electronic device 100 may output various views 111, 112, 113, and 114 on the display 110, in response to a user touch input on a touch screen provided on the display 110. If the user performs a rightward scroll including a downward touch, a touch move, and a touch release, on the touch screen when the electronic device 100 outputs the view 111 including an image containing a watch object on the display 110, the view 112 including a text and an image that indicate the number of steps taken by the user may be output on the display 110. As another example, if the user performs a rightward scroll on the touch screen when the electronic device 100 outputs the view 111 including an image containing a watch object on the display 110, the view including a symbol and a text based on a music play application and the view 114 including icons of applications installed in the electronic device 100 may be sequentially output on the display 110.

According to embodiments, the user input for changing the view is not limited to a rotation of the rotary member 120 or a touch input on the display 110. The user input may include an input using a physical button 130 or a signal on physical quantities, such as on an inclination of the electronic device, which is detected by an embedded gyro sensor or an acceleration of the electronic device 100, an embedded acceleration sensor, or various sensors.

Figure 2:
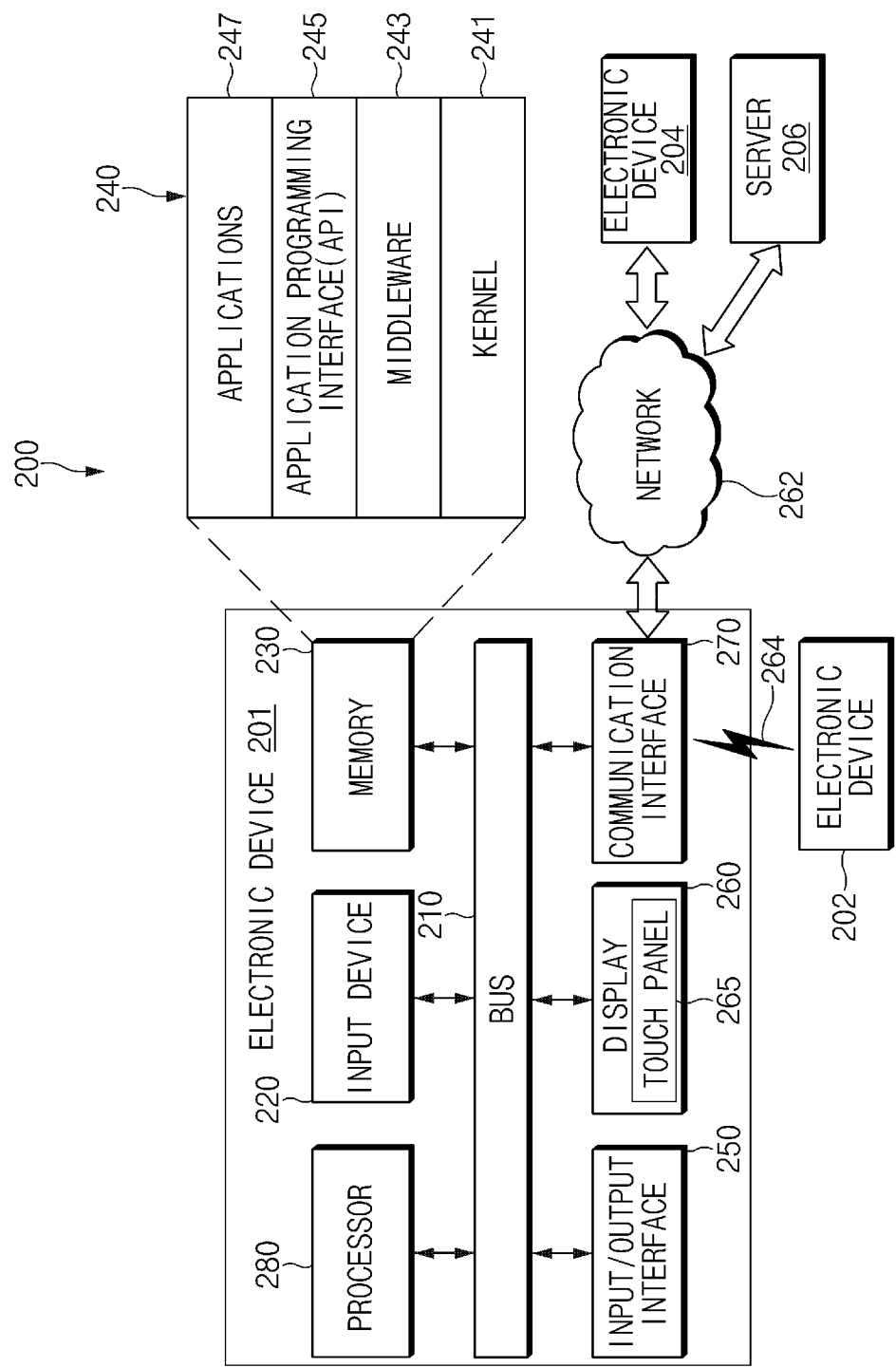
FIG. 2 illustrates an electronic device according to an embodiment of the present disclosure.

FIG. 2 illustrates an electronic device according to an embodiment of the present disclosure.

Referring to FIG. 2, the electronic device 201 may correspond to the electronic device 100 of FIGS. 1A and 1B. In embodiments, the electronic devices 201, 202, and 204 and the server 206 may be connected to each other through a network 262 or a short range communication 264.

According to an embodiment, the electronic device 201 may include a bus 210, an input device 220, a memory 230, an input/output interface 250, a display 260, a communication interface 270, and a processor 280. In some embodiments, the electronic device 201 may exclude at least one of the elements or may additionally include another element.

The bus 210 may include a circuit that connects the components 220 to 280 and transfers communications, such as control messages and/or data, between the components.

The input device 220 may include various examples of an interface through which the user and the electronic device 201 interact. For example, the input device 220 may include a rotary member, such as the rotary member 120 of FIG. 1A, a physical button, such as the physical button 130 of FIG. 1A, and/or a touch panel 265 provided on the display 260. According to embodiments, the input device 220 may refer to various types of sensors provided in the electronic device 201, in addition to the example in which the input device 220 may be directly manipulated by the user.

The memory 230 may include volatile and/or nonvolatile memories. The memory 230 may store a command or data related to at least one other component of the electronic device 201. According to an embodiment, the memory 230 may store software and/or a program 240, such as a first application or a second application. The program 240 may include a kernel 241, middleware 243, an application programming interface (API) 245, and/or applications 247. At least two of the kernel 241, the middleware 243, or the API 245 may be referred to as an operating system (OS).

The kernel 241 may control or manage system resources that are used to execute operations or functions implemented in the other programs, and may provide an interface through which the middleware 243, the API 245, or the applications 247 access individual components of the electronic device 201 to control or manage the system resources.

The middleware 243 may function as an intermediary that enables the API 245 or the applications 247 to communicate with the kernel 241 to exchange data.

The middleware 243 may process one or more work requests received from the applications 247, according to their priorities. For example, the middleware 243 may give a priority, by which a system resource, such as the bus 210, the processor 280, or the memory 230 of the electronic device 201 may be used, to at least one of the applications 247. For example, the middleware 243 may perform scheduling or load balancing for the one or more work requests by processing the one or more work requests according to the priority given to the at least one of the applications 247.

The API 245 is used, by the applications 247, to control a function provided by the kernel 241 or the middleware 243, and may include at least one interface or function, such as an instruction) such as for file control, window control, image processing, and text control.

The input/output interface 250 may function as an interface that may transfer a command or data that are input from the user or another external device to another component(s) of the electronic device 201, and may output a command or data received from another component(s) of the electronic device 201 to the user or anther external device.

The display 260 may include a liquid crystal display (LCD), a light emitting diode (LED) display, an organic light emitting diode (OLED) display, a micro electromechanical system (MEMS) display, and an electronic paper display.

The display 260 may have various shapes such as circular or rectangular shape, and may display various contents, such as a text, an image, a video, an icon, or a symbol, to the user. The display 260 may include a touch panel 265 that receives a touch, gesture, proximity, or hovering input using an electronic pen or the user's body.

The communication interface 270 may set communication between the electronic device 201 and an external device, such as a first external electronic device 202, a second external electronic device 204, or a server 206, and may be connected to a network 262 through a wireless communication or a wired communication to communicate with the external device.

The wireless communication is a cellular communication protocol, and may use at least one of long-term evolution (LTE), LTE-advanced (LTE-A), code division multiple access (CDMA), wideband CDMA (WCDMA), a universal mobile telecommunications system (UMTS), wireless broadband (WiBro), or a global system for mobile communications (GSM). The wireless communication may include a short range communication 264 which may include at least one of wireless fidelity (Wi-Fi), Bluetooth®, near field communication (NFC), magnetic stripe transmission (MST), or GNSS.

An MST may generate a pulse according to transmission data by using an electromagnetic signal, and the pulse may generate a magnetic field signal. The electronic device 201 may transmit the magnetic field signal to a POS device, detect the magnetic field signal by using an MST reader, and restore the data by converting the detected magnetic signal into an electrical signal.

The GNSS may include at least one of a global positioning system (GPS), a global navigation satellite system (Glonass), a Beidou navigation satellite system (Beidou), the European global satellite-based navigation system (or Galileo), according to an in-use area or a bandwidth. Hereinafter, in the present disclosure, "GPS" may be interchangeably used with "GNSS". The wired communication may include at least one of a universal serial bus (USB), a high definition multimedia interface (HDMI), recommended standard-232 (RS-232), and a plain old telephone Service (POTS). The network 262 may include at least one of a computer network, such as a LAN or a WAN, the Internet, and a telephone network.

The processor 280 may be electrically connected to one or more other elements of the electronic device 201 through the bus 110, and may include one or more of a central processing unit (CPU), an application processor (AP), a graphic processing unit, or a communication processor (CP).

The processor 280 may execute operations and/or data processing related to the control or communication of at least one other component of the electronic device 201.

According to an embodiment, the processor 280 may execute at least one application which may be loaded in the memory 230.

The processor 280 may activate or deactivate an application, or a process of the application, that is being executed. For example, the processor 280 may, among the application processes loaded in the memory 230, activate and deactivate a process of at least one application.

According to an embodiment, if an application is activated, the processor 280 may output a view that is rendered by the activated application on the display 260. For example, the processor 280 may collect graphic data corresponding to an activity of the activated application, and may output the view on the display 260 by supplying the collected graphic data to the display 260. If the view rendered by the activated application is output on the display 260, the view by the deactivated application may not be output on the display 260. The activation and the deactivation of the application may be distinguished from execution of the application. Accordingly, even in the case of the deactivated application, the process of the application may still be stored in the memory 230.

According to an embodiment, the processor 280 may output a first view rendered through activation of a first application on the display 260. For example, the first view may include a first image that is produced by the first application. For example, the processor 280 may produce a first image based on the first application, and may store the first image in the memory 230. Subsequently, if the first application is activated, the processor 280 may read the first image stored in the memory 230 such that the first image is included in the first view. Through this, the processor 280 may output the first view including the first image on the display 230.

According to an embodiment, the first view may include a first image that is produced by the first application at a specific frame rate. For example, when the first application corresponds to a watch application, the watch application may produce an image (including a first image and time information) including a watch object at a specific frame rate, such as 5 to 50 frames per second. The first image including the watch object may be included in a first view that is rendered by activation of the watch application.

According to an embodiment, the processor 280 may receive a user input through the input device 220 while the first view including the first image is output on the display 260. For example, the user input may include a touch input that is received through the touch panel 265, an input that is received from various sensors, or a rotation input that is received through a rotary member.

According to an embodiment, the processor 280 may provide the user input to the second application, instead of the first application that renders the first view.

The processor 280 may activate the second application in response to the user input, and may output the second view that is rendered through the activation of the second application on the display 260. For example, the second view may include a second image that is produced by the second application, and the first image that is produced by the first application may be included in the second image.

For example, the second application may be activated in response to the user input. The processor 280 may produce a second image based on the activated second application, and may store the second image in the memory 230. The first image that is produced by the first application may be included in the second image. Subsequently, based on the second application, the processor 280 may read the second image stored in the memory 230 such that the second image is included in the second view. Through this, the processor 280 may output the second view including the second image on the display 230.

According to an embodiment, the second application may correspond to a home application for composing the home screen of the electronic device 201. The processor 280 may activate the home application immediately after the user input, such as a downward touch, is received. The processor 280 may output the second view that is rendered through the activation of the home application on the display 260. The rendered second view may include the second image produced by the home application, and the second image may include the first image, such as the image containing a watch object, produced by the first application, such as the watch application.

According to an embodiment, the first view and the second view may be recognized externally in the same way. For example, if a user input is received while the first view including the first image produced by the first application is output, the second view including the second image produced by the second application may be output. The second image may include only the first image, and thus, the first view and the second view may be externally recognized as the same image.

According to embodiments, the processor 280 may output a third view on the display 260, the third view following the second view (including the second image), based on another user input. The third view may include a third image that is provided by the second application, and the third image may include at least one of at least one text, an image, a symbol, an icon, or a widget.

For example, the processor 280 may output the third view by the second application on the display 260, based on the user input, such as a scrolling which comprises a downward touch, touch move, and touch release, while the second view is output. When the user contacts his/her own finger on the display 260, i.e., downward touch, and moves the finger in a certain direction on the display 260, i.e., touch move, and then releases the finger from the display 260, i.e., touch release, the scrolling can be accomplished.

According to embodiments, in order to reduce power consumption, the electronic device 201 may operate in a standby mode if a user input is not received or a specific time period elapses after the user input disappears. The standby mode may include a first standby mode and a second standby mode.

For example, in the first standby mode, the processor 280 of the electronic device 201 may always activate the first application. Accordingly, throughout the time when the electronic device 201 is operating in the first standby mode, the first image produced by the first application may be included in the first view to be output on the display 260.

As another example, in the second standby mode, the processor 280 of the electronic device 201 may deactivate all the applications and may turn off the display 260. Accordingly, when operating in the second standby mode, the electronic device 201 may further reduce power consumption as compared with in the first standby mode.

For example, if a user input that satisfies a specific condition is received through the input device 220 while the electronic device 201 operates in the second standby mode, the processor may activate the first application. That is, the processor 280 may deviate from the second standby mode in response to the user input that satisfies the specific condition, and the first image produced by the first application may be included in the first view to be output on the display 260.

The above-described operation of the processor 280 is an example, and the present disclosure is not limited to the above description. For example, the operation of the processor described in other parts of the present disclosure also may be understood as an operation of the processor 280. At least some of the operations of the electronic device 201 described in the present disclosure may be understood as being operations of the processor 280.

The first and second external electronic devices 202 and 204 may be the same or different type devices from the electronic device 201. According to an embodiment, the server 206 may include a group of one or more servers, and at least two of the operations executed by the electronic device 201 may be executed by another or a plurality of electronic devices 202 and 204 or the servers 206.

According to an embodiment of the present disclosure, when the electronic device 201 should execute some functions or services automatically or upon request, it may request at least some functions associated with the functions or services from another device, in place of or in addition to directly executing the functions or services. The other electronic device may execute a requested function or an additional function, and may transfer the result to the electronic device 201. The electronic device 201 may process the received result directly or additionally, and may provide a requested function or service. To this end, cloud computing, distributed computing, or client-server computing may be used.

Figure 3:
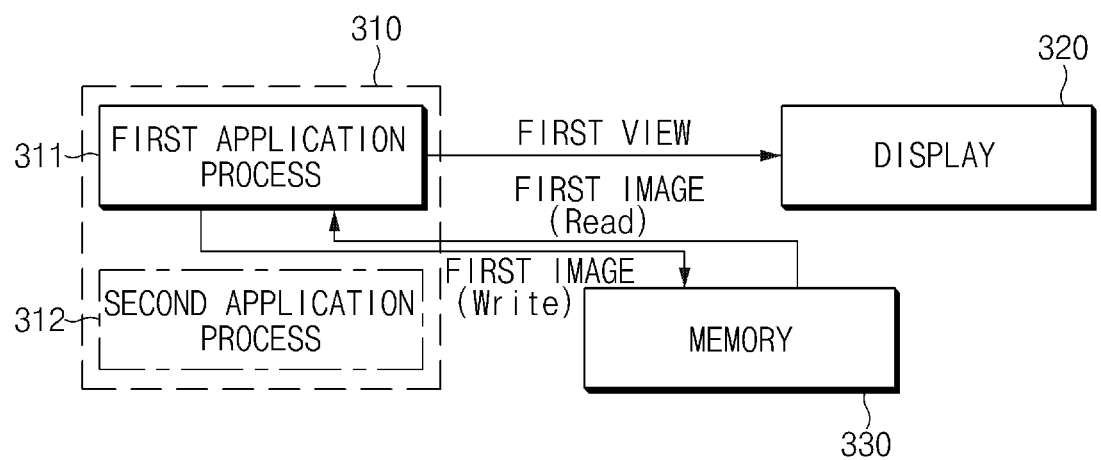
FIG. 3 illustrates a method of outputting an image according to an embodiment of the present disclosure.

FIG. 3 illustrates a method of outputting an image according to an embodiment of the present disclosure.

Referring to FIG. 3, the electronic device according to an embodiment may output a first image, such as an image containing a watch object, based on a first application, such as a watch application.

For example, the processor 310 may load a first application process 311 and a second application process 312 in the memory 330, by executing a first application and a second application. The first application process 311 and the second application process 312 may be understood as a software configuration that is implemented by the processor 310, and the operations of the processes 311 and 312 may be understood as operations of the processor 310.

According to an embodiment, the processor 310 may store a first image in the memory 330, such as an image containing a watch object, based on the first application process 311. The first image may be produced at a specific frame rate regardless of the activation of the first application process 311 and may be stored in the memory 330.

The processor 310 may activate the first application process 311 while the electronic device operates in the first standby mode. As another example, if a user input that satisfies a specific condition is received while the electronic device is operating in the second standby mode, the processor 310 may activate the first application process 311. The processor 310 may deactivate the second application process 312 that is being executed.

If the first application process 311 is activated, the processor 310 may render the first view to output the rendered first view on the display 320. For example, the processor 310 may read a first image stored in the memory 330, and may include the first image in the first view to output the first view including the first image on the display 320.

Figure 4:
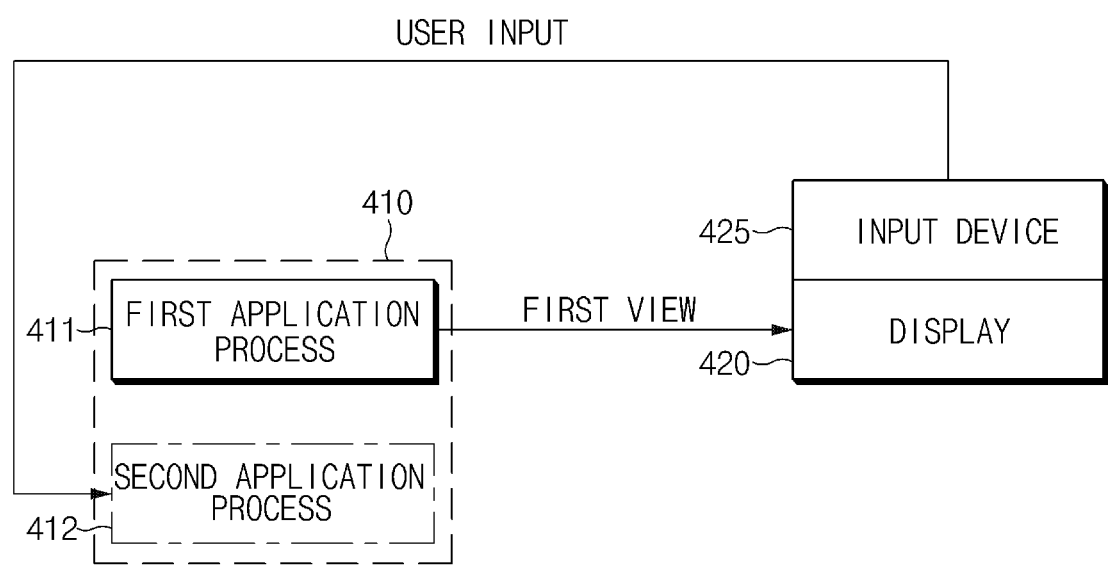
FIG. 4 illustrates a method of outputting an image according to an embodiment of the present disclosure.

FIG. 4 illustrates a method of outputting an image according to an embodiment of the present disclosure.

Referring to FIG. 4, the electronic device may receive a user input through various types of input devices 425. At least some configurations of the electronic device of FIG. 4 may correspond to at least some configurations of the electronic device of FIG. 3. For example, the processor 410 may correspond to the processor 310 of FIG. 3, the first application process 411 may correspond to the first application process 311 of FIG. 3, the second application process 412 may correspond to the second application process 312 of FIG. 3, and the display 420 may correspond to the display 320 of FIG. 3. Therefore, a repeated description of the corresponding configuration will be omitted for the sake of conciseness.

The first view rendered by the first application process 410 may be output on the display 420 of the electronic device of FIG. 4. If a user input is received through an input device 425 while the first view is output, the input device 425 may convert the user input into an electrical signal. The electrical signal may be provided to the second application process 412.

The user input may include various inputs, such as a touch input on a touch panel included in a display, an input using a physical button or an input signal on physical quantities, such as an inclination of the electronic device, which is detected by an embedded gyro sensor, or an acceleration of the electronic device 100, which is detected by an embedded acceleration sensor.

Figure 5:
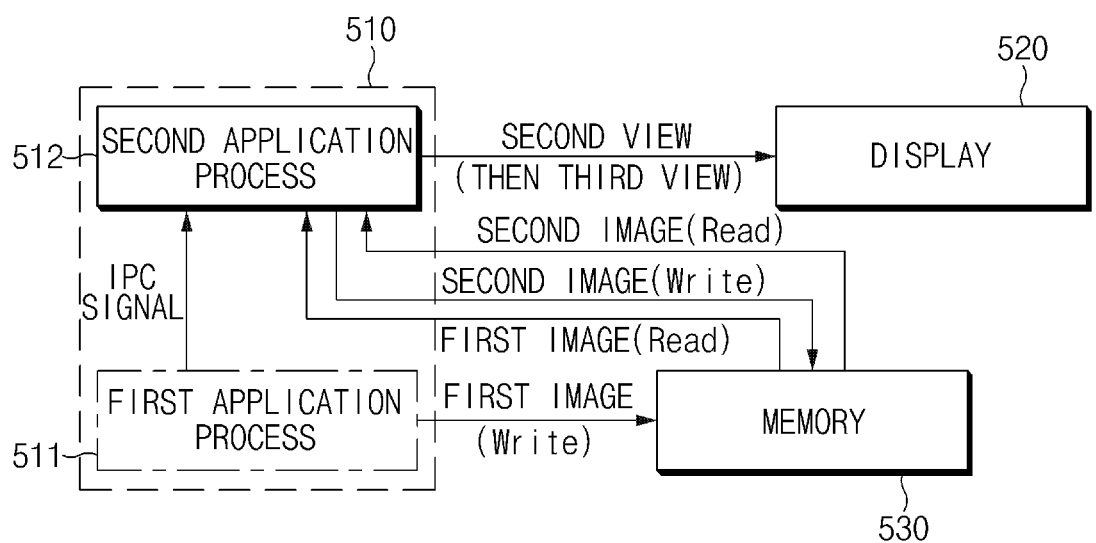
FIG. 5 illustrates a method of outputting an image according to an embodiment of the present disclosure.

FIG. 5 illustrates a method of outputting an image according to an embodiment of the present disclosure.

Referring to FIG. 5, the electronic device may output a second view, based on a second application, in response to a user input. For example, an operation of the electronic device of FIG. 5 may be performed after an operation of the electronic device of FIG. 4.

At least some configurations of the electronic device of FIG. 5 may correspond to at least some configurations of the electronic device of FIG. 3 or FIG. 4. Therefore, a repeated description of the corresponding configuration will be omitted for the sake of conciseness.

In FIG. 5, if a user input is received, the processor 510 may deactivate the first application process 511 and activate the second application process 512 in response to the user input. The first application process 511 may produce a first image at a specific frame rate, and may write the produced first image in the memory 530.

If the produced first image is written in the memory 530, the first application process 511 may transmit a specific signal to the second application process 512. For example, the specific signal may correspond to an inter-process communication (IPC) signal between the first application process 511 and the second application process 512.

The second application process 512 may read a first image that is stored in the memory 530, in response to the specific signal. The second application process 512 may produce a second image including (or embedding) the read first image. Subsequently, the second application process 512 may write the second image in the memory 530 and may read the second image from the memory 530. The second application process 512 may provide the read second image to the second view (or the second image) to output the second view including the second image on the display 520.

According to embodiments, the processor 510 may output a third view by the second application process 512 on the display 520. The third view following the second view may be output in a basis of the additional user input. According to an example, if a downward touch is received while the first view including the first image is output on the display 520, the second image including the first may be output as the second view. If a touch move and/or a touch release follows the downward touch, the third view by the second application process 512 may be output on the display 520, following the second view.

Figure 6:
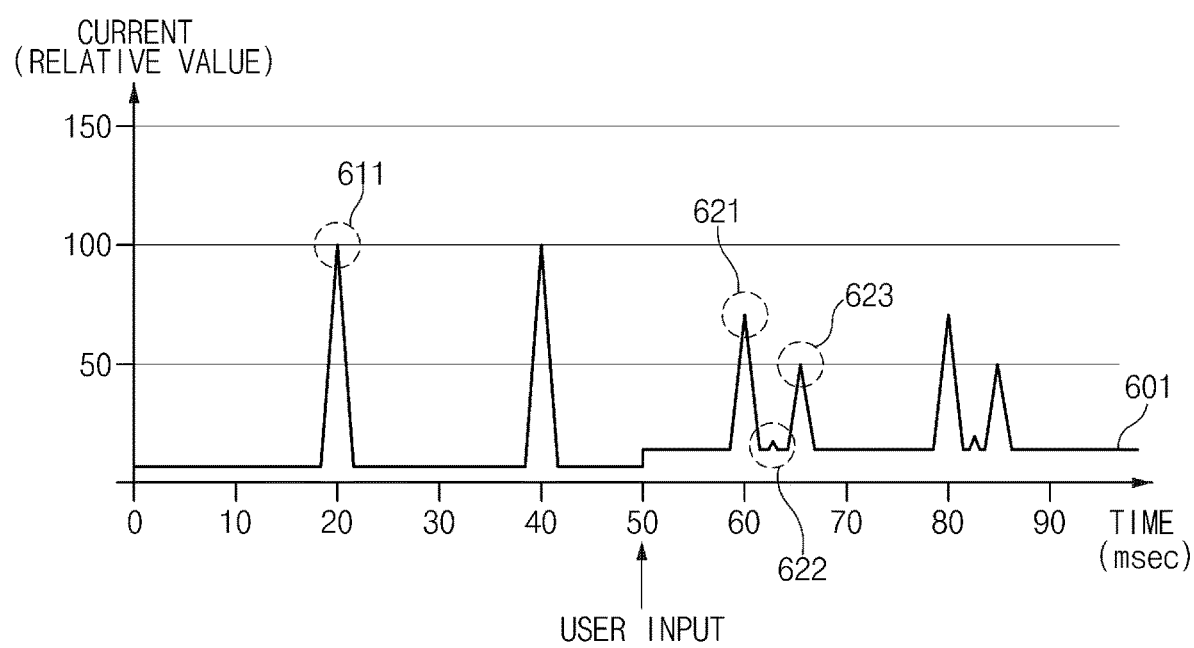
FIG. 6 illustrates a graph of currents that are consumed in the method of outputting an image according to an embodiment of the present disclosure.

FIG. 6 illustrates a graph of currents that are consumed in the method of outputting an image according to an embodiment of the present disclosure.

For example, the electronic device may sequentially perform the operations of FIGS. 3, 4, and 5.

Referring to curve 601, before a time point (50 msec) at which a user input is received, the operation of FIG. 3 may be repeatedly performed at a specific time interval. For example, in the electronic device, the activated first application process may render a first view (including a first image) at an interval of 20 msec (50 frames per second) to output the rendered first view on the display. The electronic device may instantaneously consume a current of level 100 whenever the first view is rendered, that is, an interval of 20 msec, as illustrated in 611.

For example, if a user input is received at 50 msec, the operation of FIG. 4 may be performed. For example, if the user input is received while the first view by the first application process is output on the display, the electronic device may provide the user input to the second application process.

After the time point (50 msec) when the user input is received, the operation of FIG. 5 may be performed at a specific time interval. For example, the processor of the electronic device may deactivate the first application process and activate the second application process in response to the user input. The activated second application process may render the second view to output the rendered second view on the display.

For example, the deactivated first application process may produce a first image at a specific frame rate, and may write the produced first image in the memory. The electronic device may instantaneously consume a current of about level 70 whenever the first image is produced and is written in the memory, as illustrated in 621.

If the produced first image is written in the memory, the first application process may generate a specific signal, such as an IPC signal, and transmit the generated signal to the second application process. The electronic device may consume a current of about level 25 whenever the signal is generated and transmitted, as illustrated in 622.

The second application process may read the first image written in the memory and render the second view including the first image. The electronic device may consume a current of about level 50 whenever the second view is rendered, as illustrated in 623. Accordingly, the output of the second view based on the second application may provide various UI/UXs, but may consume more currents than the output of the first view based on the first application.

According to embodiments of the present disclosure, when a user input is not received, the electronic device may output a first image that consumes less power. If a user input is received, the electronic device may render the second image including the first image, based on the second application by which various views may be converted. Through this, the power consumption of the battery may be reduced and the convenience of using the UI/UX applied to the electronic device is not hampered.

Figure 7:
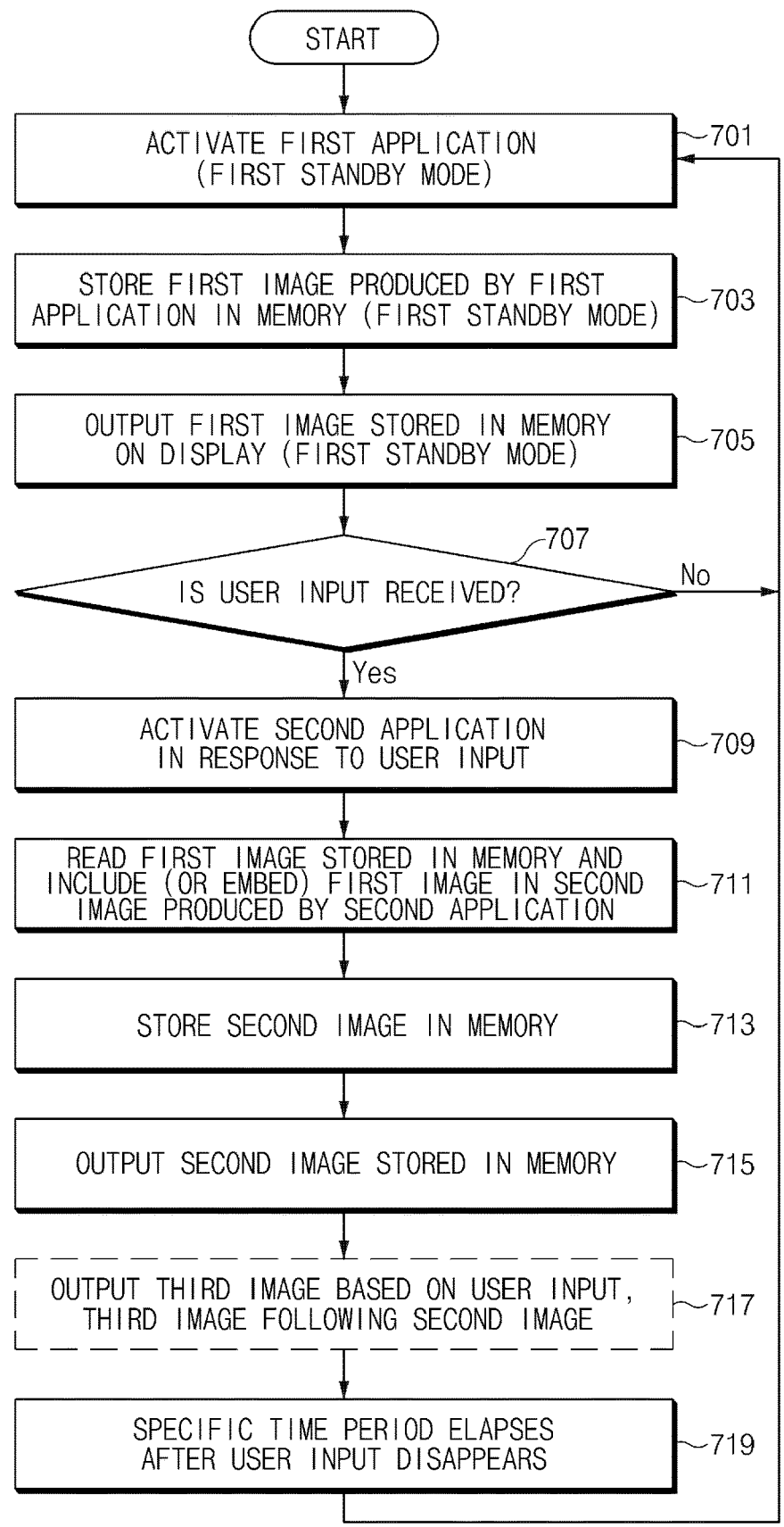
FIG. 7 illustrates a method of outputting an image according to an embodiment of the present disclosure.

FIG. 7 illustrates a method of outputting an image according to an embodiment of the present disclosure.

Referring to FIG. 7, the method of outputting an image according to an embodiment may include operations 701 to 719, which may be performed by the electronic device 201 of FIG. 2, and may be implemented by instructions that may be performed (or executed) by the processor 280 of the electronic device 201. The instructions may be stored in the memory 230 of the electronic device 201. Hereinafter, the reference numerals of FIG. 2 are used in the description of operations 701 to 719.

In operation 701, the processor 280 may activate the first application.

In operation 703, the processor 280 may store the first image produced by the first application in the memory 230. For example, the first image may contain watch objects that are produced at a specific frame rate.

In operation 705, the processor 280 may output the first image stored in the memory 230 on the display 260. The output of the first image may indicate the output of the first view including the first image.

According to an embodiment, operation 701 to 705 may be performed while the electronic device 201 operates in the first standby mode. Accordingly, as long as the electronic device 201 operates in the first standby mode, the first image may be continuously output on the display 260.

In operation 707, the processor 280 may determine whether a user input is received through the input device 220. The user input may include a touch input, such as a downward touch that is received from the touch panel 265 or a rotation input that is received from a rotary member. In addition to the example, the user input may include a push of a physical button, a signal regarding a physical quantity detected by a sensor, or a voice input received through a microphone. When a user input is received ('Yes' in operation 707), the processor 280 may proceed to operation 709, or otherwise ('No' in operation 707), may return to operation 701.

In operation 709, the processor 280 may activate the second application in response to the user input. According to an embodiment, the first application may be deactivated through the activation of the second application.

In operation 711, the processor 280 may produce a second image based on the second application. The processor 280 may read the first image stored in the memory, and may include the first image in the second image.

In operation 713, the processor 280 may store the second image produced by the second application in the memory 230.

In operation 715, the processor 280 may output the second image stored in the memory 230 on the display 230. The output of the second image may indicate the output of the second view including the second image.

In operation 717, the processor 280 may output a third image on the display 230 following the second image, based on another user input. The third image may correspond to the image produced based on the second application. For example, when a scrolling which comprises a downward touch, touch move, and the touch release is received in operation 707, the first image may be converted to the second image in response to the downward touch, as illustrated in operation 715, and the second image may be converted to the third image in response to the touch move and/or the touch release, as illustrated in operation 717. According to embodiments, operation 717 may be omitted, such as when only a downward touch is received in operation 707 as a user input.

In operation 719, if a specific time period elapses from a time point when the user input disappears, the processor 280 of the electronic device 201 may return to operation 701. For example, if a specific time period elapses from operation 717 and/or a time point when the user input received in operation 717 disappears, operations 701 to 705 may be performed.

Figure 8:
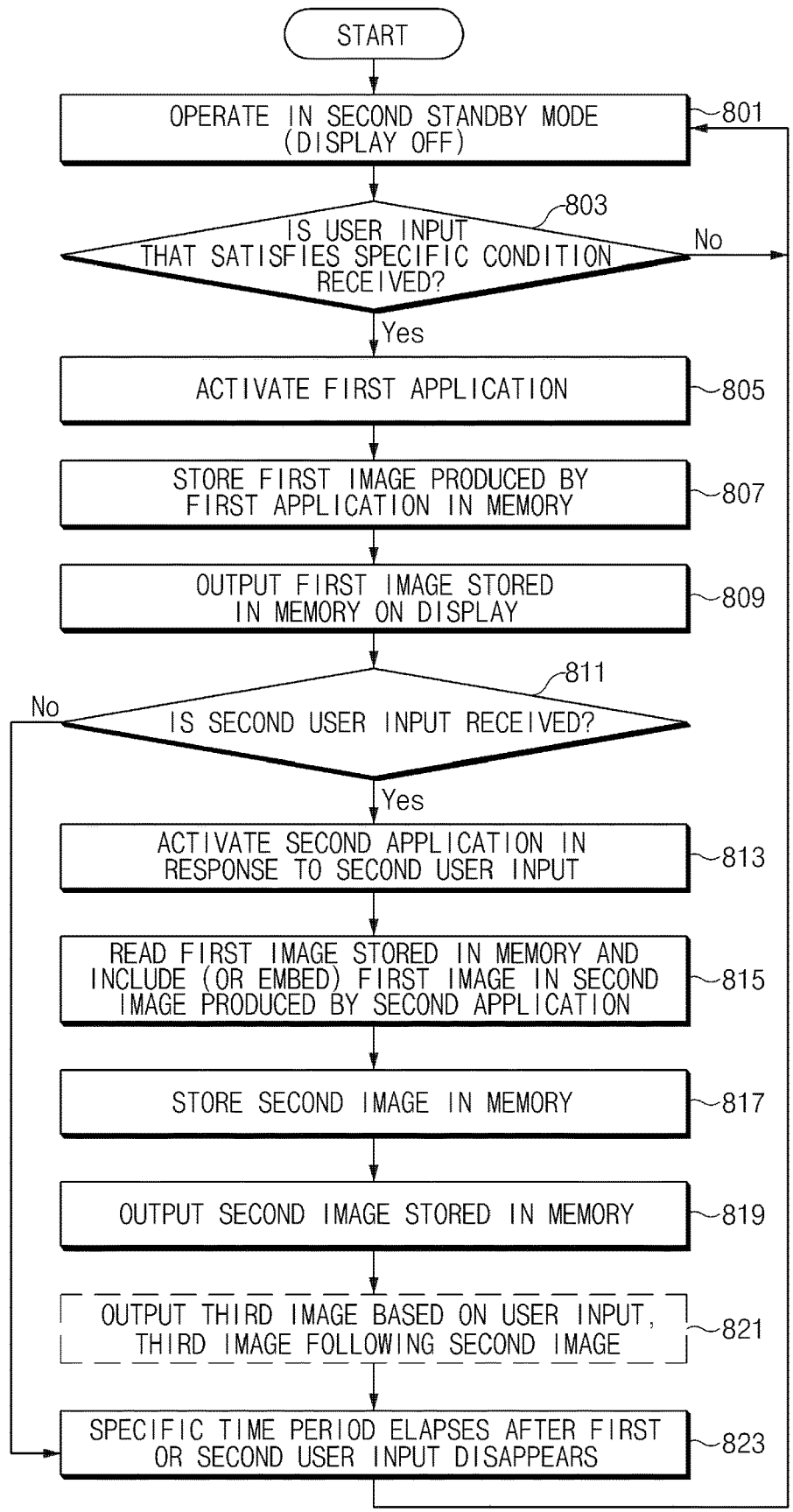
FIG. 8 illustrates a method of outputting an image according to another embodiment of the present disclosure.

FIG. 8 illustrates a method of outputting an image according to another embodiment of the present disclosure.

Referring to FIG. 8, the method may be implemented by instructions that may be stored in the memory 230 and performed by the processor 250 of the electronic device 201. Hereinafter, the reference numerals of FIG. 2 are used in the description of operations 801 to 823.

In operation 801, the electronic device 201 may operate in a second standby mode in which the processor 280 may deactivate the application that is being executed, and may turn off the display 260.

In operation 803, the processor 280 may determine whether a first user input that satisfies a specific condition is received through the input device 220. For example, the first user input may include various inputs, such as a touch input on a touch panel included in a display, an input using a physical button or an input signal on physical quantities, such as an inclination of the electronic device, which is detected by an embedded gyro sensor or an acceleration of the electronic device 201, which is detected by an embedded acceleration sensor, which are detected by various sensors. When a user input that satisfies a specific condition is received ('Yes' in operation 803), the processor 280 may proceed to operation 805, or otherwise ('No' in operation 803), may return to operation 801.

In operation 805, the processor 280 may activate the first application.

In operation 807, the processor 280 may store the first image produced by the first application in the memory 230.

In operation 809, the processor 280 may output the first image stored in the memory 230 on the display 230.

In operation 811, the processor 280 may determine whether the second user input is received through the input device 220. Similarly to the first user input, the second user input may include various inputs, such as a touch input on a touch panel included in a display, an input using a physical button or an input signal on physical quantities, such as an inclination of the electronic device, which is detected by an embedded gyro sensor or an acceleration of the electronic device 201, an embedded acceleration sensor, or various sensors. When a second user input is received ('Yes' in operation 811), the processor 280 may proceed to operation 813, or otherwise ('No' in operation 811), may return to operation 823.

In operation 813, the processor 280 may activate the second application in response to the second user input. According to an embodiment, the first application may be deactivated through the activation of the second application.

In operation 815, the processor 280 may produce a second image based on the second application, and may read the first image stored in the memory, and be embed the first image in the second image.

In operation 817, the processor 280 may store the second image produced by the second application in the memory 230.

In operation 819, the processor 280 may output the second image stored in the memory 230 on the display 230.

In operation 821, the processor 280 may output a third image on the display 230 following the second image, based on another user input. The third image may correspond to the image produced based on the second application. According to embodiments, operation 821 may be omitted.

In operation 823, if a specific time period elapses from a time point when the user input disappears, the processor 280 may return to operation 801. For example, the electronic device 201 may receive a first user input in operation 803 ('Yes' in operation 803), and may not receive a second user input in operation 811 ('No' in operation 811). If a specific time period elapses after the first user input received in operation 803 disappears, the processor 280 may return to operation 801. As another example, the electronic device 201 may receive a first user input in operation 803 ('Yes' in operation 803), and may receive a second user input in operation 811 ('No' in operation 811). If a specific time period elapses after the second user input received in operation 803 disappears, the processor 280 of the electronic device 201 may return to operation 801.

Figure 9:
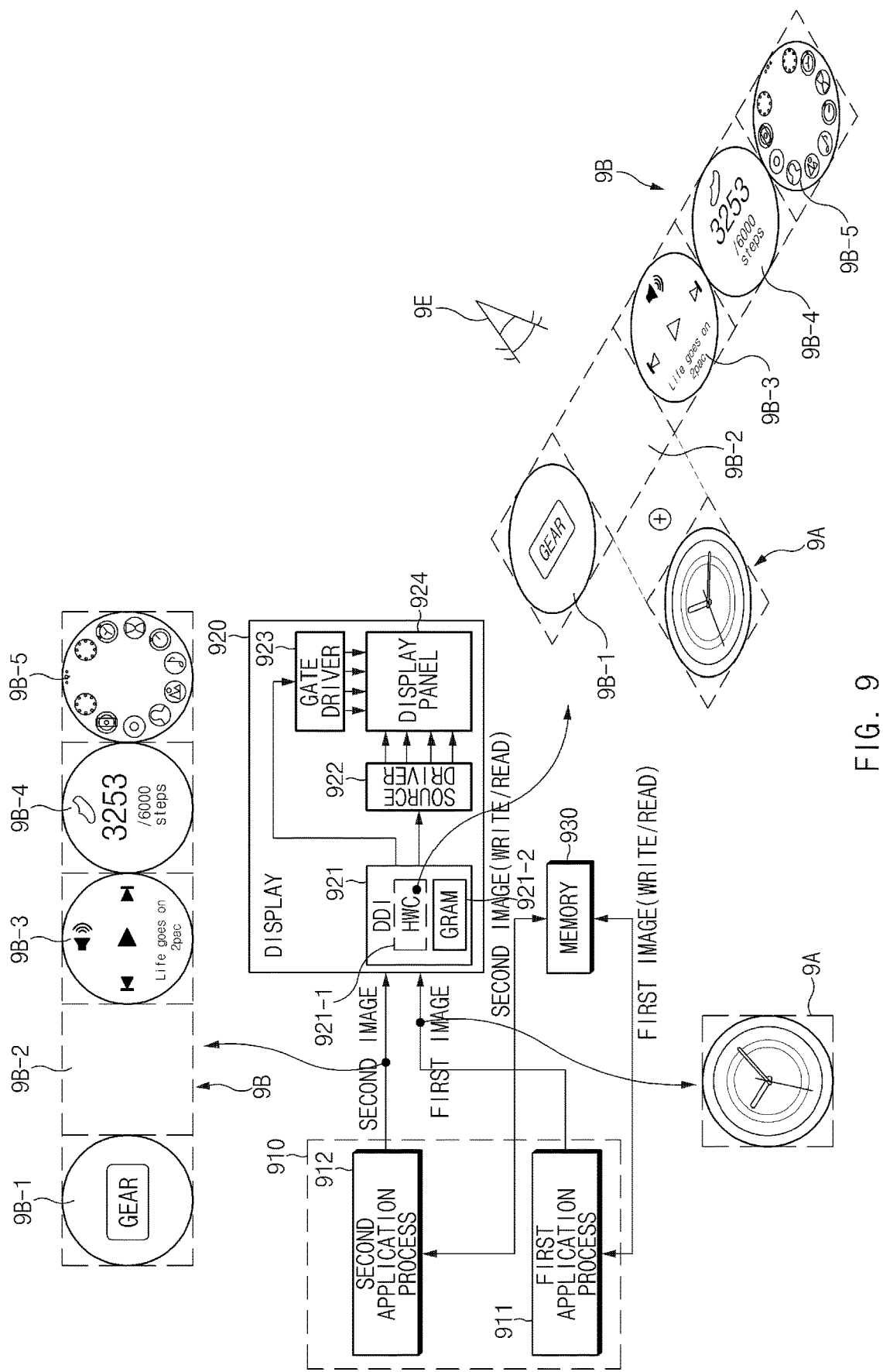
FIG. 9 illustrates a method of outputting an image of an electronic device according to an embodiment of the present disclosure.

FIG. 9 illustrates a method of outputting an image of an electronic device according to an embodiment of the present disclosure.

According to an embodiment, if a user input is received through a physical button or a physical quantity of a specific value is detected from various sensors, the electronic device may perform the operation of FIG. 9. For example, when the electronic device is a smartwatch, if the user inclines the smartwatch, the electronic device may perform the operation of FIG. 9 to output a watch image on the display.

Referring to FIG. 9, the processor 910 may load a first application process 911 and a second application process 912 in the memory 930, by executing a first application, such as a watch application, and a second application, such as a home application. The first application process 911 and the second application process 912 may be understood as a software configuration that is implemented by the processor 910, and may be understood as being operations of the processor 910.

According to an embodiment, the processor 910 may produce (or render) a first image 9A at a specific frame rate based on the first application process 911. The first image 9A may include a watch object and may be written in the memory 930 and, in turn, be read by the first application process 911 and delivered to the display 920.

According to an embodiment, the processor 910 may produce a second image 9B based on the second application process 912. The second image 9B may include a plurality of screens 9B-1, 9B-2, 9B-3, 9B-4, and 9B-5 that compose a home screen of the electronic device. For example, screen 9B-1 may include a notification widget, screen 9B-3 may include a widget of a music play application, screen 9B-4 may include a widget for displaying the number of steps taken by the user, and screen 9B-5 may include icons of the applications installed in the electronic device. Meanwhile, screen 9B-2 may not include any object, i.e., may be left blank, as will be explained below. The second image 9B may be written in the memory 930 and, in turn, be read by the second application process 912, and may be delivered to the display 920.

The display 920 may receive the first image 9A and the second image 9B from the processes 911 and 912, and may output a composite image of the first image 9A and the second image 9B.

According to an embodiment, the display 920 may include a display driver integrated (DDI) circuit 921, a source driver 922, a gate driver 923, and a display panel 924, or may not employ at least one of the elements or may additionally include another element, such as a touch panel or a pressure sensor.

The display driver integrated circuit 921 may receive a first image 9A and a second image 9B from the processes 911 and 912, and may compose (or synthesize) the images 9A and 9B. According to an embodiment, the display driver integrated circuit 921 may include a hardware compositor 921-1 and a graphic RAM 921-2. The display driver integrated circuit 921 may additionally include an oscillator, a timing controller (T-con), a frame rate (or frame frequency) control module, and a pixel power application module.

The hardware compositor 921-1 may compose a part of the display driver integrated circuit 921 or may refer to a dedicated chip included in the display driver integrated circuit 921. The hardware compositor 921-1 may compose the first image 9A and the second image 9B stored in the graphic RAM 921-2. For example, the hardware compositor 921-1 may overlay a portion of the second image 9B, such as an area corresponding to screen 9B-2, on the first image 9A.

The graphic RAM 921-2 may store image data that is provided by the processor 910. For example, the graphic RAM 912 may store the first image 9A and the second image 9B delivered from the processor 910. The graphic RAM 921-2 may refer to a frame buffer. When the memory size of the graphic RAM 921-2 is larger than the memory space corresponding to the resolution and the number of color gradations of the display panel 924, two or more images may be stored, and thus the graphic RAM 921-2 may refer to a multi (frame) buffer.

The source driver 922 and the gate driver 923 may generate signals that are supplied to a scan line and a data line of the display panel 924, based on a source control signal and a gate control signal received from the display driver integrated circuit 921, respectively.

The display panel 924 may display various pieces of information to the user, may include an LCD panel or an AM-OLED panel, and may be implemented to be flexible or transparent.

According to an embodiment, the display panel 924 may display a composite image that is composed by the hardware compositor 921-1 of the display driver integrated circuit 921. The composite image may be an image in which an area of the second image 9B, which corresponds to screen 9B-2, is overlaid on the first image 9A. In this case, because an area corresponding to screen 9B-2 does not include any object, the user (or the eyes of the user) 9E may view only an object, such as an image containing a watch object, included in the first image 9A.

Figure 10:
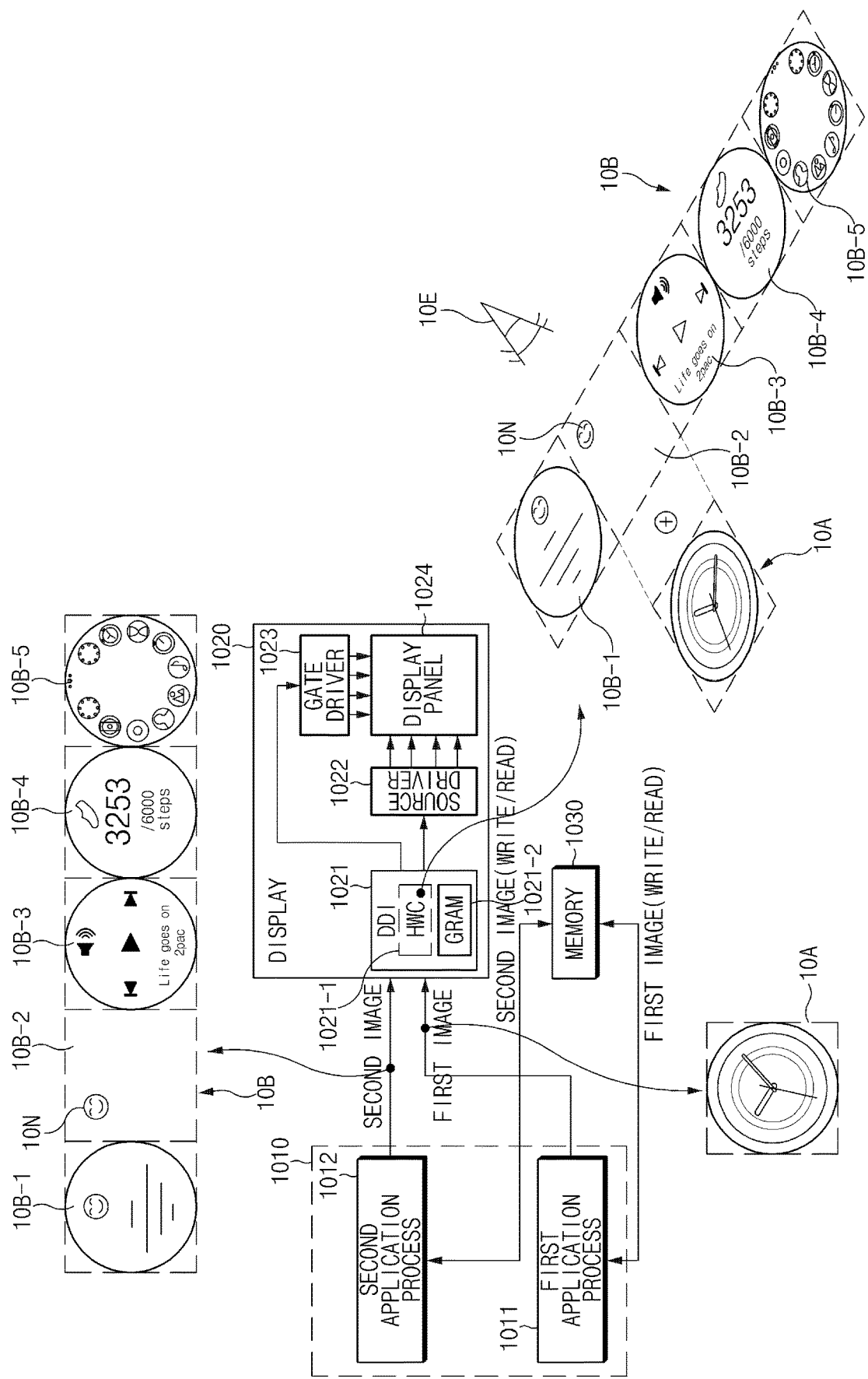
FIG. 10 illustrates a method of outputting an image of an electronic device that receives a notification according to an embodiment of the present disclosure.

FIG. 10 illustrates a method of outputting an image of an electronic device that receives a notification according to an embodiment of the present disclosure.

According to an embodiment, if a notification, such as reception of a message of an IM application or a notification of a social network service application, is generated or a physical quantity of a specific value is detected from various sensors, the electronic device may perform the operations of FIG. 10. Hereinafter, in a description of FIG. 10, a repeated description of FIG. 9 will be omitted for conciseness.

Referring to FIG. 10, the processor 1010 may load a first application process 1011 and a second application process 1012 in the memory 1030, by executing a first application and a second application. The first application process 1011 and the second application process 1012 may be understood as a software configuration that is implemented by the processor 1010, and the operations of the processes 1011 and 1012 may be understood as operations of the processor 1010.

According to an embodiment, the processor 1010 may produce a first image 10A at a specific frame rate based on the first application process 1011. The first image 10A may include a watch object and may be written in the memory 1030 and, in turn, may be read by the first application process 1011 and delivered to the display 1020.

According to an embodiment, the processor 1010 may produce (or render) a second image 10B based on the second application process 1012. The second image 10B may include a plurality of screens 10B-1, 10B-2, 10B-3, 10B-4, and 10B-5 that compose a home screen of the electronic device.

For example, screen 10B-1 may include a notification widget, screen 10B-3 may include a widget of a music play application, screen 10B-4 may include a widget for displaying the number of steps taken by the user, and screen 10B-5 may include icons of the applications installed in the electronic device. Screen 10B-2 may include an indicator, such as an icon or a badge, 10N that indicates the received notification on a transparent base (that is, having no data). The second image 10B may be written in the memory 1030 and, in turn, be read by the second application process 1012 and delivered to the display 1020.

The display 1020 may receive the first image 10A and the second image 10B from the processes 1011 and 1012, and may output a composite image of the first image 10A and the second image 10B. According to an embodiment, the display 1020 may include a display driver integrated (DDI) circuit 1021, a source driver 1022, a gate driver 1023, and a display panel 1024.

The display driver integrated circuit 1021 may include a hardware compositor (HWC) 1021-1 and a graphic RAM 1021-2. For example, the graphic RAM 1021-2 may store the first image 10A and the second image 10B delivered from the processor 1010. Thereafter, the hardware compositor 1021-1 may compose the first image 10A and the second image 10B stored in the graphic RAM 1021-2. The composite image may be output through the display panel 1024.

According to an embodiment, the hardware compositor 1021-1 may compose a portion of the second image 10B and the first image 10A. For example, the hardware compositor 1021-1 may overlay a portion of the second image 10B, such as an area corresponding to screen 10B-2, on the first image 10A. Because an indicator 10N that indicates the received notification is include in an area corresponding to screen 10B-2, the user 10E may view an image in which the indicator 10N is arranged at a portion of the first image, as the composite image.

Figure 11:
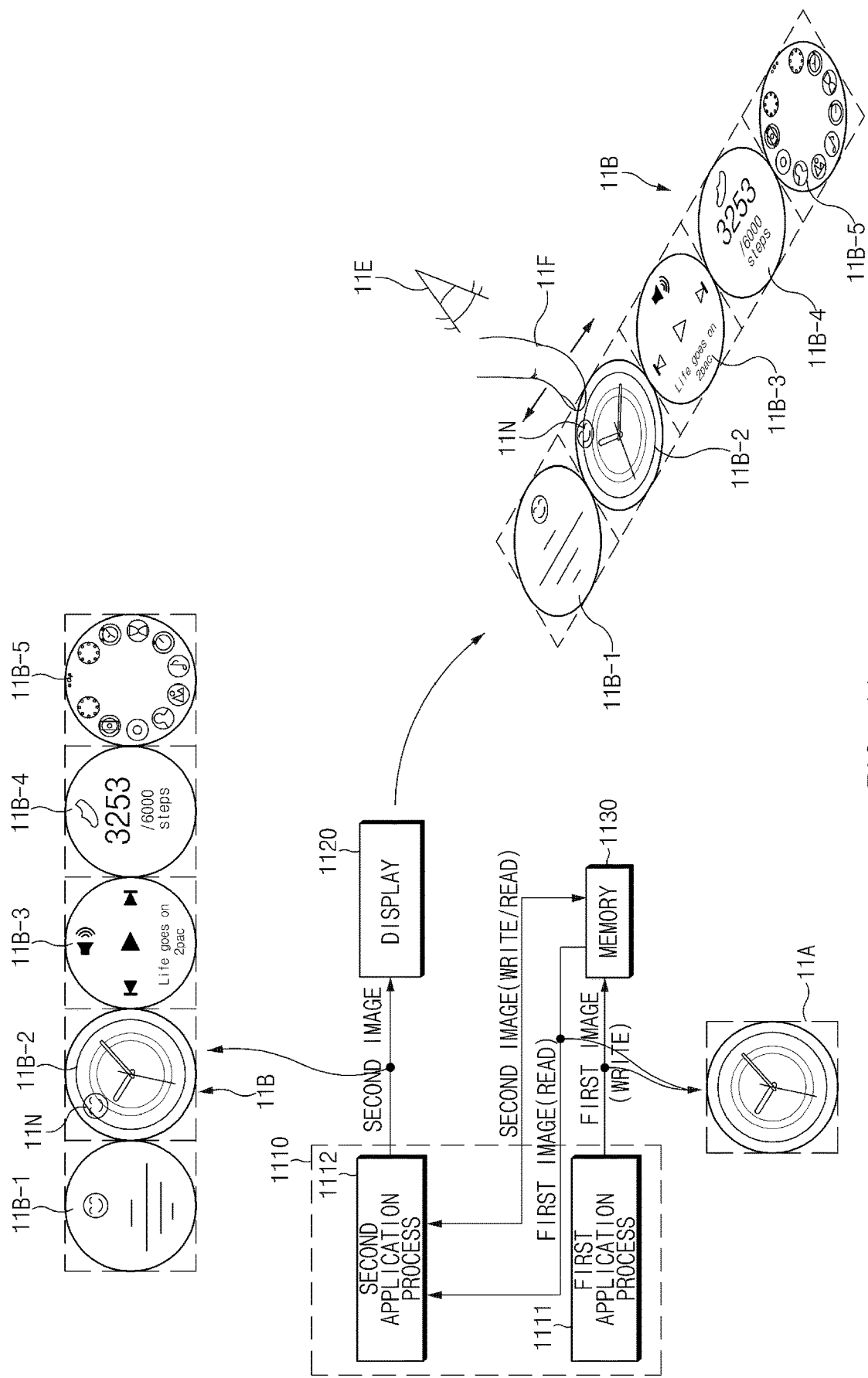
FIG. 11 illustrates a method of outputting an image of an electronic device that receives a touch input according to an embodiment of the present disclosure.

FIG. 11 illustrates a method of outputting an image of an electronic device that receives a touch input according to an embodiment of the present disclosure.

According to an embodiment, if a touch input 11F that is made on the display (or the touch panel included in the display) by the user is received, such as immediately after a downward touch for the display is made, the electronic device may perform the operation of FIG. 11. The touch input from the user may be delivered to the second application process 1112. Hereinafter, in a description of FIG. 10, a repeated description of FIG. 9 may be omitted for conciseness.

Referring to FIG. 11, the processor 1110 may load a first application process 1111 and a second application process 1112 in the memory 1130, by executing a first application and a second application. The first application process 1111 and the second application process 1112 may be understood as a software configuration that is implemented by the processor 1110, and the operations of the processes 1111 and 1112 may be understood as operations of the processor 1110.

According to an embodiment, the first application process 1111 may produce (or render) the first image 11A at a specific frame rate. The first image 11A may include a watch object and may be written in the memory 1130.

According to an embodiment, the second application process 1112 may produce the second image 11B. For example, the second application process 1112 may compose the first image 11A and a portion of the second image 11B to produce a second image 11B.

As an example, the second application process 1112 may read the first image 11A stored in the memory 1130 and may compose the first image 11A and a portion of the second image 11B by using a computing resource of the processor 1110, such as including a graphic processing unit (GPU). For example, the second application process 1112 may embed the first image 11A in screen 11B-2 of the second image 11B, and the indicator 11N that indicates the received notification on the first image 11A Accordingly, the second application process 1112 may produce screen 11B-1 including a content on the received notification, screen 11B-2 in which the indicator 11N is arranged on the first image 11A, screen 11B-3 including a widget of a music play application, screen 11B-4 including a widget for displaying the number of steps taken by the user, and screen 11B-5 including icons of the applications installed in the electronic device.

The second image 11B may be written in the memory 1130 and, in turn, be read by the second application process 1112, and may be delivered to the display 1120. The display 1120 may receive the second image 11B from the second application process 1112 to output the second image 11B. Through this, the user 11E may view any one of screens 11B-1, 11B-2, 11B-3, 11B-4, and 11B-5. The user 11E may recognize that screen 11B-2 is the same as the composite image of screen 10B-2 of FIG. 10 and the first image 10A. However, on screen 11B-2, unlike in FIGS. 9 and 10, the display 1120 does not compose using the hardware compositor (HWC).

According to embodiments, the touch input 11F of the user may include scrolling. In this case, the electronic device may convert the screen while applying a specific animation effect in response to the scrolling. For example, when rightward scrolling is performed by the user while screen 11B-2 is output on the display 1120, screen 11B-2 may be converted into screen 11B-3, since the first image 11A is composed with screen 11B-2 of the second image 11B by software.

According to the embodiments of FIGS. 9 and 10, As the electronic device uses the hardware compositor (HWC), when the first image is output or an additional object is displayed in the first image, the electronic device may consume less power (compared to FIGS. 5 and 11) than when the synthesis is made by using a GPU. In FIG. 11, the same screen as that of FIG. 10 is displayed and more power may be consumed, however, touch scrolls, which cannot be easily implemented using the hardware compositor (HWC), can be made.

Figure 12:
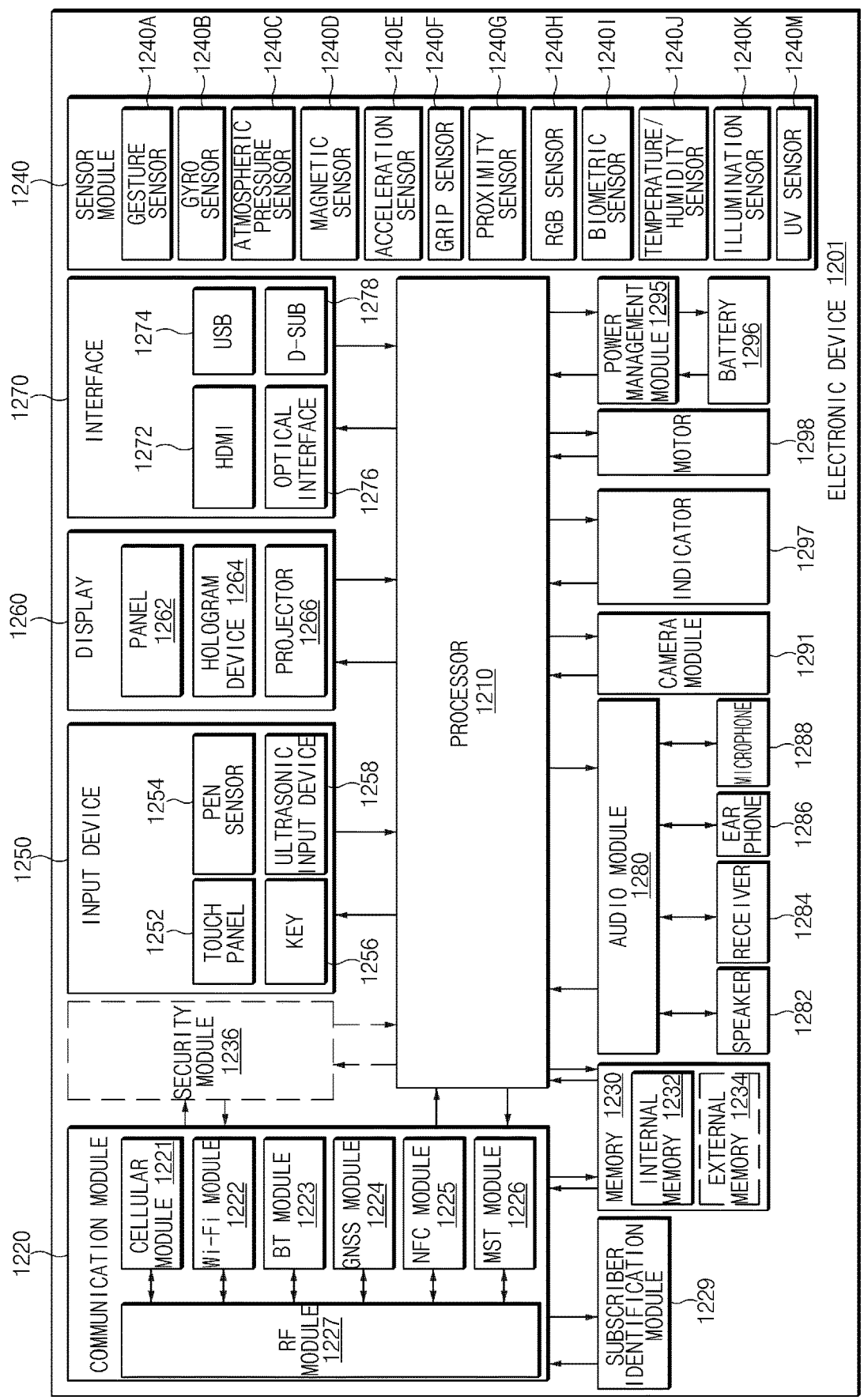
FIG. 12 is a block diagram of an electronic device according to embodiments of the present disclosure.

FIG. 12 is a block diagram of an electronic device according to embodiments of the present disclosure.

Referring to FIG. 12, an electronic device 1201 may include all or a part of the electronic device 201 illustrated in FIG. 2. The electronic device 1201 may include at least one application processor (AP) 1210, a communication module 1220, a subscriber identification module (SIM) card 1229, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may control a plurality of hardware or software components connected to the processor 1210 by driving an operating system or an application program and perform a variety of data processing and calculations. The processor 1210 may be implemented by a system on chip (SoC) and may further include a graphical processing unit (GPU) and/or an image signal processor. The processor 1210 may load instructions or data, received from at least one other component, such as a non-volatile memory, in a volatile memory to process the loaded instructions or data, and may store various types of data in a non-volatile memory.

The communication module 1220 may have the same or similar structure to the communication interface 270 of FIG. 2 and may include a cellular module 1221, a Wi-Fi module 1222, a Bluetooth module 1223, a GNSS module 1224, such as a GPS module, a Glonass module, a Beidou module, or a Galileo module, an NFC module 1225, an MST module 1126, and a radio frequency (RF) module 1227.

The cellular module 1221 may provide a voice call, a video call, a text message service, or an Internet service through a communication network, may distinguish between and authenticate electronic devices 1201 within a communication network using a, such as SIM card 1229, may perform at least some of the functions that the processor 1210 may provide, and may include a communication processor (CP).

Each of the Wi-Fi module 1222, the Bluetooth module 1223, the GNSS module 1224, the NFC module 1225, and the MST module 1226 may include a processor for processing data transmitted/received through the corresponding module. According to some embodiments, at least two of the cellular module 1221, the Wi-Fi module 1222, the Bluetooth module 1223, the GNSS module 1224, the NFC module 1225, and the MST module 1226 may be included in one integrated chip (IC) or IC package.

The RF module 1227 may transmit/receive a communication signal, such as an RF signal, and may include a transceiver, a power amp module (PAM), a frequency filter, a low noise amplifier (LNA), or an antenna. According to another embodiment, at least one of the cellular module 1221, the Wi-Fi module 1222, the Bluetooth module 1223, the GNSS module 1224, the NFC module 1225, and the MST module 1226 may transmit and receive an RF signal through a separate RF module.

The SIM card 1229 may include a card and/or an embedded SIM, and may further include unique identification information, such as an integrated circuit card identifier (ICCID) or subscriber information, such as international mobile subscriber identity (IMSI).

The memory 1230 may include an internal memory 1232 or an external memory 1234. The internal memory 1232 may include at least one of a volatile memory, such as a dynamic random access memory (DRAM), a static RAM (SRAM), and a synchronous dynamic RAM (SDRAM), and a non-volatile memory, such as a one-time programmable read only Memory (OTPROM), a programmable ROM (PROM), an erasable and programmable ROM (EPROM), an electrically erasable and programmable ROM (EEPROM), a flash memory, such as a NAND flash memory or a NOR flash memory, a hard driver, or a solid state drive (SSD).

The external memory 1234 may further include a flash drive including a compact flash (CF), a secure digital (SD), a micro secure digital (Micro-SD), a mini secure digital (Mini-SD), an extreme digital (xD), and a memory stick, for example. The external memory 1234 may be functionally and/or physically connected to the electronic device 1201 through various interfaces.

The security module 1236 includes a storage space having a relatively high security level as compared with the memory 1230, and may be a circuit that guarantees safe data storage and a protected execution environment. The security module 1236 may be implemented by a separate circuit, and may include a separate processor. The security module 1236 may be present in a detachable smart chip or an SD card, or may include an embedded secure element (eSE) embedded in a fixed chip of the electronic device 1201. The security module 1236 may be driven by an operation system (OS) that is different from the operating system of the electronic device 1201. For example, the security module 1236 may be operated based on a java card open platform (JCOP) operating system.

The sensor module 1240 may measure a physical quantity or detect an operational state of the electronic device 1201, and may convert the measured or detected information to an electrical signal. The sensor module 1240 may include at least one of a gesture sensor 1240A, a gyro sensor 1240B, an atmospheric pressure sensor 1240C, a magnetic sensor 1240D, an acceleration sensor 1240E, a grip sensor 1240F, a proximity sensor 1240G a color sensor 1240H, such as a red, green, blue (RGB) sensor), a biometric sensor 1240I, a temperature/humidity sensor 1240J, an illumination sensor 1240K, and an ultraviolet (UV) sensor 1240M. Additionally or alternatively, the sensor module 1240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1240 may further include a control circuit for controlling one or more sensors included therein. In some embodiments, the electronic device 1201 may further include a processor configured to control the sensor module 1240 as a part of or separately from the processor 1210, and may control the sensor module 1240 while the processor 1210 is in a sleep state.

The input device 1250 may include a touch panel 1252, a (digital) pen sensor 1254, a key 1256, an ultrasonic input device 1258, and a rotary member. The touch panel 1252 may use at least one of a capacitive type, a resistive type, an infrared type, and an ultrasonic type, may further include a control circuit, and may further include a tactile layer that provides a tactile reaction to a user.

The (digital) pen sensor 1254 may include a recognition sheet which is a part of the touch panel or a separate recognition sheet. The key 1256 may include a physical button, an optical key, or a keypad. The ultrasonic input device 1258 may detect ultrasonic waves generated by an input tool through a microphone 1288 and may identify data corresponding to the detected ultrasonic waves. The rotary member, as an example of the input device 1250, may be implemented by a ring-shaped member that surrounds a periphery of the display 1260 and is rotatable in a specific direction.

The display 1260 may include a panel 1262, a hologram device 1264, or a projector 1266. The panel may be implemented to be flexible, transparent, or wearable and may be formed as a single module together with the touch panel 1252. The hologram device 1264 may show a three dimensional image in the air using an interference of light. The projector 1266 may display an image by projecting light onto a screen. The screen may be located in the interior of or on the exterior of the electronic device 1201. The display 1260 may further include a control circuit for controlling the panel 1262, the hologram device 1264, or the projector 1266.

The interface 1270 may include a high-definition multimedia interface (HDMI) 1272, a universal serial bus (USB) 1274, an optical interface 1276, and a D-subminiature (D-sub) 1278 and may be included in the communication interface 270 illustrated in FIG. 2. Additionally or alternatively, the interface 1270 may include a mobile high-definition link (MHL) interface, an SD card/multimedia card (MMC) interface, or an infrared data association (IrDA) standard interface.

The audio module 1280 may bilaterally convert a sound and an electrical signal. At least some elements of the audio module 1280 may be included in the input/output interface 250 illustrated in FIG. 2. The audio module 1280 may process sound information input or output through a speaker 1282, a receiver 1284, earphones 1286, or the microphone 1288.

The camera module 1291 may photograph a still image and a dynamic image. According to an embodiment, the camera module 291 may include one or more image sensors, such as a front sensor or a back sensor, a lens, an image signal processor (ISP) or a flash, such as an LED or xenon lamp.

The power management module 1295 may manage power of the electronic device 1201 and may include a power management integrated circuit (PMIC), a charger integrated circuit (IC), or a battery gauge. The PMIC may have a wired and/or wireless charging scheme. Examples of the wireless charging method may include a magnetic resonance method, a magnetic induction method, or an electromagnetic wave method, for example. Additional circuits, such as a coil loop, a resonance circuit, or a rectifier for wireless charging may be further included. The battery gauge may measure a residual quantity of the battery 1296, and a voltage, a current, or a temperature while charging. The battery 1296 may include a rechargeable battery and/or a solar battery.

The indicator 1297 may indicate particular status of the electronic device 1201 or a part thereof, such as a booting, message, or charging status, for example. The motor 1298 may convert an electrical signal into mechanical vibrations, and may generate a vibration or haptic effect. The electronic device 1201 may include a processing device, such as the GPU, for supporting mobile TV. The processing unit for supporting mobile TV may process media data pursuant to a certain standard of digital multimedia broadcasting (DMB), digital video broadcasting (DVB), or media flow (MediaFlo™.

Each of the elements described in the specification may include one or more components, and the terms of the elements may be changed according to the type of the electronic device. In embodiments of the present disclosure, the electronic device may include at least one of the elements described in the specification, and some elements may be omitted or additional elements may be further included. Some of the elements of the electronic device according to embodiments of the present disclosure may be coupled to form one entity, and may perform the same functions of the corresponding elements before they are coupled.

Figure 13:
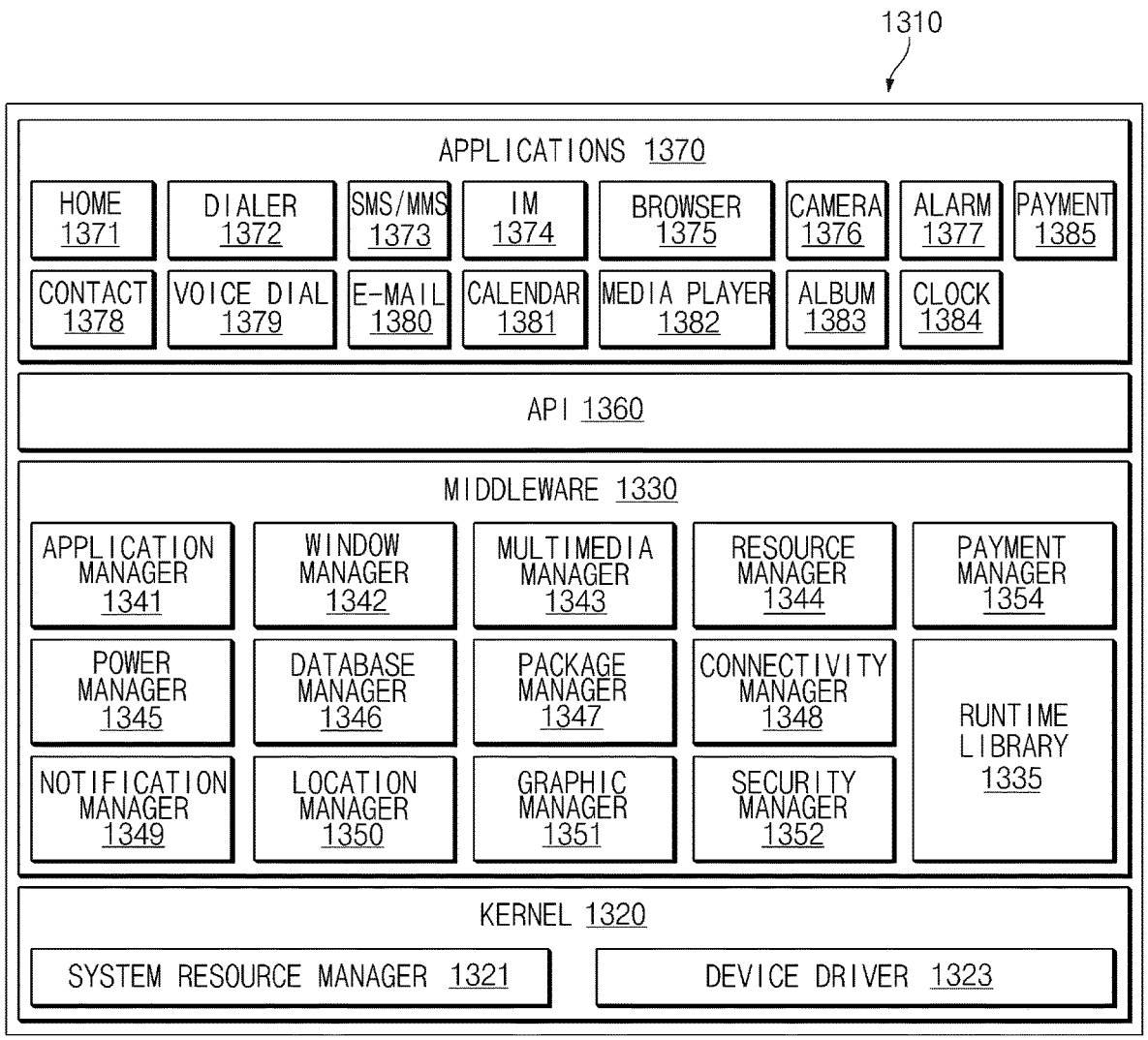
FIG. 13 illustrates a block diagram of a program module according to embodiments of the present disclosure.

FIG. 13 illustrates a block diagram of a program module according to embodiments of the present disclosure.

According to an embodiment, the program module 1310 may include an OS that controls resources related to an electronic device, and various applications that are driven on an OS. The operating system may be Android, iOS, Windows, Symbian, Tizen, or Bada, for example.

The program module 1310 may include a kernel 1320, a middleware 1330, an API 1360, and applications 1370. At least a part of the program module 1310 may be preloaded on an electronic device or may be downloaded from external electronic devices, such as external electronic devices 202 and 204 and a server 206).

The kernel 1320 may include a system resource manager 1321, and a device driver 1323. The system resource manager 1321 may control, allocate, or retrieve the system resources. According to one embodiment, the system resource manager 1321 may include a process management unit, a memory management unit, or a file system management unit. The device driver 1323 may include a display driver, a camera driver, a Bluetooth driver, a shared-memory driver, a USB driver, a keypad driver, a Wi-Fi driver, an audio driver, or an inter-process communication (IPC) driver.

The middleware 1330 may provide a function required by the applications 1370 in common or provide various functions to the applications 1370 through the API 1360 so that the applications 1370 can efficiently use limited system resources of the electronic device. According to an embodiment, the middleware 1330, may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, a security manager 1352, and a payment manager 1354.

The run time library 1335 may include a library module that a compiler uses in order to add new functions through a programming language while the applications 1370 are executed. The run time library 1335 may perform input/output management, memory management, or a function for an arithmetic function.

The application manager 1341 may manage a lifecycle of at least one of the applications 1370. The window manager 1342 may manage a GUI resource used in a screen. The multimedia manager 1343 may detect a format required for reproducing various media files and encode or decode a media file using a codec appropriate for the corresponding format. The resource manager 1344 may manage resources, such as a source code, a memory, or a storage space, of at least one of the applications 1370.

The power manager 1345 may operate together with a basic input/output system (BIOS), so as to manage a battery or power and may provide power information required for the operation of the electronic device. The database manager 1346 may generate, search for, or change a database to be used by at least one of the applications 1370. The package manager 1347 may manage the installation or the updating of applications distributed in a package file form.

For example, the connectivity manager 1348 may manage wireless connections, such as Wi-Fi or Bluetooth. The notification manager 1349 may display or notify an event such as a received message, an appointment, a proximity notification, and the like to a user without disturbance. The location manager 1350 may manage location information of the electronic device. The graphic manager 1351 may manage graphic effects to be provided to a user and user interfaces related to the graphic effects. The security manager 1352 may provide various security functions required for system security or user authentication. According to an embodiment of the present disclosure, when the electronic device has a phone function, the middleware 1330 may further include a telephony manager for managing a voice or video communication function of the electronic device.

The middleware 1330 may include a middleware module for forming a combination of various functions of the aforementioned components. The middleware 1330 may provide modules specialized according to the type of OS in order to provide differentiated functions. In addition, some existing components may be dynamically removed from the middleware 1330, or new components may be added to the middleware 230.

The API 1360 is a set of API programming functions, and may be provided another configuration according to an operating system. For example, for each platform, one API set may be provided in a case of Android or iOS, and two or more API sets may be provided in a case of Tizen.

The applications 1370 may include home 1371, dialer 1372, SMS/MMS 1373, instant message (IM) 1374, browser 1375, camera 1376, alarm 1377, contact 1378, voice dial 1379, e-mail 1380, calendar 1381, media player 1382, album 1383, clock 1384, payment 1385, health care, such as for measuring an exercise degree or blood glycose, and environmental information applications.

According to an embodiment, the applications 1370 may include an information exchange application that supports exchange of information between the electronic device and external electronic device. The information exchange application may include a notification relay application for forwarding specific information to an external electronic device, or a device management application for managing an external electronic device.

For example, the notification relay application may have a function of forwarding, to external electronic devices, notification information generated from other applications of the electronic device 10. The notification relay application may receive notification information from an external electronic device and provide the received notification information to a user.

The device management application may, such as install, delete, or update a function for at least a part of an external electronic device communicating with the electronic device 10, such as activating/deactivating the external electronic device itself or adjusting the resolution of a display, an application operating in the external electronic device, or a service provided from the external electronic device, such as a telephone call or a message service.

According to an embodiment, the applications 1370 may include a health management application designated according to an attribute of an external electronic device, an application that is received from an external electronic device, such as, and a preloaded application or a third party application that is downloaded from a server. The names of the elements of the program module 1310 according to the illustrated embodiment may vary according to the type of the operating system.

According to embodiments, at least a part of the program module 1310 may be implemented by software, firmware, hardware, or two or more combinations thereof. At least a part of the program module 1310 may be executed by a processor, such as. At least a part of the program module 1310 may include a module, a program routine, a set of instructions, or a process for performing at least one function.

The following are aspects of the present disclosure, as described above. There is provided an electronic device including a display, a memory, an input device configured to receive a user input, and a processor electrically connected to the display, the memory, and the input device. The memory stores instructions, when executed, cause the processor to store a first image that is produced by a first application, in the memory, output the first image stored in the memory on the display by activation of the first application, if a second application is activated in response to the user input, include the first image in a second image that is provided by the second application and store the second image including the first image in the memory, and output the second image stored in the memory on the display.

The first image may include time information and may be produced at a specific frame rate, and the second application may be for composing a home screen of the electronic device.

The process may output a third image that is produced by the second application on the display, based on the user input, the third image following the second image.

The input device may include a touch screen. The user input may include a touch input that is received through the touch screen.

The input device may comprise a ring-shaped rotary member that surrounds a periphery of the display and is rotatable on a surface center of the display, and the user input may include a rotation input that is received through the ring shaped rotary member.

The input device may include a sensor for detecting a motion of the electronic device, and the user input may include a signal related to the motion detected from the sensor.

The first application may be activated while the electronic device operates in a first standby mode.

The processor may allow the electronic device to operate in the first standby mode, if a specific time period elapses after the user input disappears.

If a user input that satisfies a specific condition is received while the electronic device operates in a second standby mode, the processor may activate the first application.

The processor may deactivate the first application and the second application and may turn off the display in the second standby mode.

The processor may be configured to provide the user input to a process of the second application, and the second application is activated in response to the provided user input.

The processor may be configured to if the second application is activated, store the first image in the memory according to the process of the first application, if the first image is stored in the memory, provide a specific signal to a process of the second application, read the first image stored in the memory according to the process of the second application, and include the first image in the second image according to the process of the second application.

The specific signal may be an IPC signal between the process of the first application and the process of the second application.

There is further provided a method of outputting an image of an electronic device, including storing a first image that is produced by a first application, in the memory, reading the first image stored in the memory by activation of the first application, if a second application is activated in response to a user input, providing the first image in a second image that is provided by the second application and store the second image in the memory, and outputting the second image stored in the memory on the display.

The image produced by the first application may be produced at a specific frame rate and may include time information.

The second application may correspond to an application for composing a home screen of the electronic device.

The method may further include, if a specific time period elapses after the user input disappears, converting the mode of the electronic device into a standby mode.

There is further provided an electronic device including a display, a memory configured to store a first application and a second application, and a processor electrically connected to the memory and the display. The processor may be configured to produce a first image by the first application, produce a second image by the second application, and provide the first image and the second image to the display. The display composes the first image and the second image, and output a composite image of the first image and the second image.

The display may include at least a display driver integrated circuit and a display panel. The display driver integrated circuit may compose the first image and the second image to form the composite image, and the composite image is output on the display panel.

The display may overlay a portion of the second image on the first image.

The first image may include time information, and the second image may compose a home screen of the electronic device.

The term "module" used in the specification may indicate a unit including one of hardware, software, or firmware or a combination of at least two or the same. The module may be interchangeably used with a unit, logic, a logical block, a component, or a circuit, may be a minimum unit or a part of an integrally configured part, may be a minimum unit or a part which performs one or more functions, and may be implemented mechanically or electromagnetically. For example, the module may include at least one of an application-specific integrated circuit (ASIC) chip, a field-programmable gate array, or a programmable-logic device, which is known or will be developed in the future, or performs certain operations.

At least some of the devices or methods according to embodiments of the present disclosure may be implemented by an instruction stored in a computer-readable storage medium in the form of a program module. When the instruction is executed by the processor, the at least one processor may perform a function corresponding to the instruction. The computer-readable storage medium may be a memory 230.

The computer-readable storage medium may include a hard disk, a floppy disk, a magnetic medium, such as a magnetic tape, an optical medium, such as a compact disk read only memory (CD-ROM), a digital versatile disk (DVD), a magneto-optical medium, such as a floptical disk, and a hardware device, such as a read only memory (ROM), a random access memory (RAM), or a flash memory. The program instructions may include high-level language codes which may be executed by a computer using an interpreter as well as machine languages created by using a compiler. The above-mentioned hardware device may be configured to be operated as one or more software module to perform operations of embodiments, and vice-versa.

The module or program module according to embodiments of the present disclosure may include at least one of the above-mentioned elements, omit at least one of them, or further include other elements. The module, the program module, or the operations performed by other elements according to embodiments of the present disclosure may be performed in a sequential, parallel, iterative, or heuristic method. Some operations may be executed in another sequence or may be omitted, or other operations may be added.

The embodiments disclosed in the specification are provided to describe the technical contents or for understanding of the technical contents, and the technical scope of the present disclosure is not limited thereto. Accordingly, the scope of the present disclosure should be construed to include all changes or embodiments based on the technical spirit of the present disclosure.

According to embodiments of the present disclosure, the electronic device may output a specific image based on a first application that consumes less power when a user input is not received. The electronic device may render an image of a watch based on a second application that may provide various UI/UXs if the user input is received. Through this, the power consumption of the battery may be reduced and convenience of the electronic device is not hampered. In addition, the present disclosure may provide various effects that are directly or indirectly recognized.

While the present disclosure has been shown and described with reference to embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a display;
    a memory;
    an input device configured to receive a user input; and
    a processor electrically connected to the display, the memory, and the input device,
    wherein the memory stores instructions which, when executed, cause the processor to:
    in response to detecting that the user input is not received or that a specific time elapses after the user input disappears:
    activate a watch application,
    generate, by using the watch application, a first image representing a watch object,
    store the first image in the memory,
    output, by using the watch application, the first image stored in the memory, and
    in response to detecting that the user input is received:
        while simultaneously activating a home application and deactivating the watch application:

obtain, by using the home application, the first image stored in the memory, generate, by using the home application, a second image by composing the first image and at least a portion of an image including a plurality of objects constituting a home screen of the electronic device, and output the second image on the display, wherein a first power consumption by the operations performed in response to detecting that the user input is not received or that the specific time elapses after the user input disappears is lower than a second power consumption by the operations performed in response to detecting that the user input is received.

2. The electronic device of claim 1, wherein the first image is generated at a specific frame rate.

3. The electronic device of claim 1, wherein the processor outputs, on the display, a third image that is generated by the home application, following the second image, based on another user input.

4. The electronic device of claim 1, wherein the input device comprises a touch screen, and wherein the user input comprises a touch input that is received through the touch screen.

5. The electronic device of claim 1, wherein the input device comprises a ring-shaped rotary member that surrounds a periphery of the display and is rotatable on a surface center of the display, and wherein the user input comprises a rotation input that is received through the ring-shaped rotary member.

6. The electronic device of claim 1, wherein the input device comprises a sensor for detecting a motion of the electronic device, and wherein the user input comprises a signal related to the motion detected from the sensor.

7. The electronic device of claim 1, wherein the processor deactivates the watch application and the home application and turns off the display.

8. The electronic device of claim 1, wherein, if the home application is activated, the processor is configured to:

provide data from the watch application to the home application, obtain the first image stored in the memory by using the home application, and include the first image in the second image by using the home application.

9. The electronic device of claim 8, wherein the data is provided based on an inter-process communication between the watch application and the home application.

* * * * *